(12) United States Patent
Cho et al.

(10) Patent No.: US 9,169,811 B2
(45) Date of Patent: Oct. 27, 2015

(54) AIR CLEANER FOR VEHICLE

(71) Applicant: Kia Motors Corporation, Seoul (KR)

(72) Inventors: Yoon Keun Cho, Daegu (KR); Doo Seok Jung, Hwaseong-si (KR)

(73) Assignee: KIA MOTORS CORPORATION, Seoul (KR)

( * ) Notice: Subject to any disclaimer, the term of this patent is extended or adjusted under 35 U.S.C. 154(b) by 35 days.

(21) Appl. No.: 14/135,544

(22) Filed: Dec. 19, 2013

(65) Prior Publication Data
US 2015/0040527 A1 Feb. 12, 2015

(30) Foreign Application Priority Data

Aug. 6, 2013 (KR) .................. 10-2013-0093355
Nov. 15, 2013 (KR) .................. 10-2013-0138872

(51) Int. Cl.
*F02M 35/02* (2006.01)
*B01D 46/00* (2006.01)

(52) U.S. Cl.
CPC ....... *F02M 35/0201* (2013.01); *F02M 35/0203* (2013.01); *B01D 46/0006* (2013.01)

(58) Field of Classification Search
CPC .......... B01D 46/0005; B01D 46/0006; B60H 3/0616; F02M 35/024; F02M 35/0203
USPC ................... 55/385.3, 481, 506; 123/198 E
See application file for complete search history.

(56) References Cited

U.S. PATENT DOCUMENTS

| | | | |
|---|---|---|---|
| 6,174,343 B1* | 1/2001 | Bloomer | 55/385.3 |
| 6,217,627 B1* | 4/2001 | Vyskocil et al. | 55/492 |
| 2003/0051453 A1* | 3/2003 | Moreau et al. | 55/385.3 |
| 2008/0110146 A1* | 5/2008 | Germain et al. | 55/385.3 |
| 2012/0073252 A1* | 3/2012 | Lee et al. | 55/385.3 |
| 2012/0192535 A1* | 8/2012 | Schrewe | 55/385.3 |

FOREIGN PATENT DOCUMENTS

| | | |
|---|---|---|
| JP | 06-007622 A | 1/1994 |
| JP | 11-13561 A | 1/1999 |
| JP | 2008-150954 A | 7/2008 |
| KR | 1999-011358 U | 3/1999 |
| KR | 10-2012-0032339 A | 4/2012 |
| KR | 10-2013-0061975 A | 6/2013 |

* cited by examiner

*Primary Examiner* — Duane Smith
*Assistant Examiner* — Minh-Chau Pham
(74) *Attorney, Agent, or Firm* — Morgan, Lewis & Bockius LLP

(57) ABSTRACT

An air cleaner for a vehicle has an improved door locking structure that is not affected by the temperature of an engine compartment, and is configured to performing a door opening/closing operation and a filter replacing operation by simple manipulation. The air cleaner includes: a filter assembly; a case accommodating and providing access to the filter assembly; a door rotatably installed at the case that opens and closes the entrance of the case; an elastic member mounted between the door and the case to apply an elastic restoring force; and a locking unit installed that locks the door at a closed position and unlocks the door by one touch manipulation of pressing the door at the closed position.

20 Claims, 19 Drawing Sheets

FIG. 16A  FIG. 16B

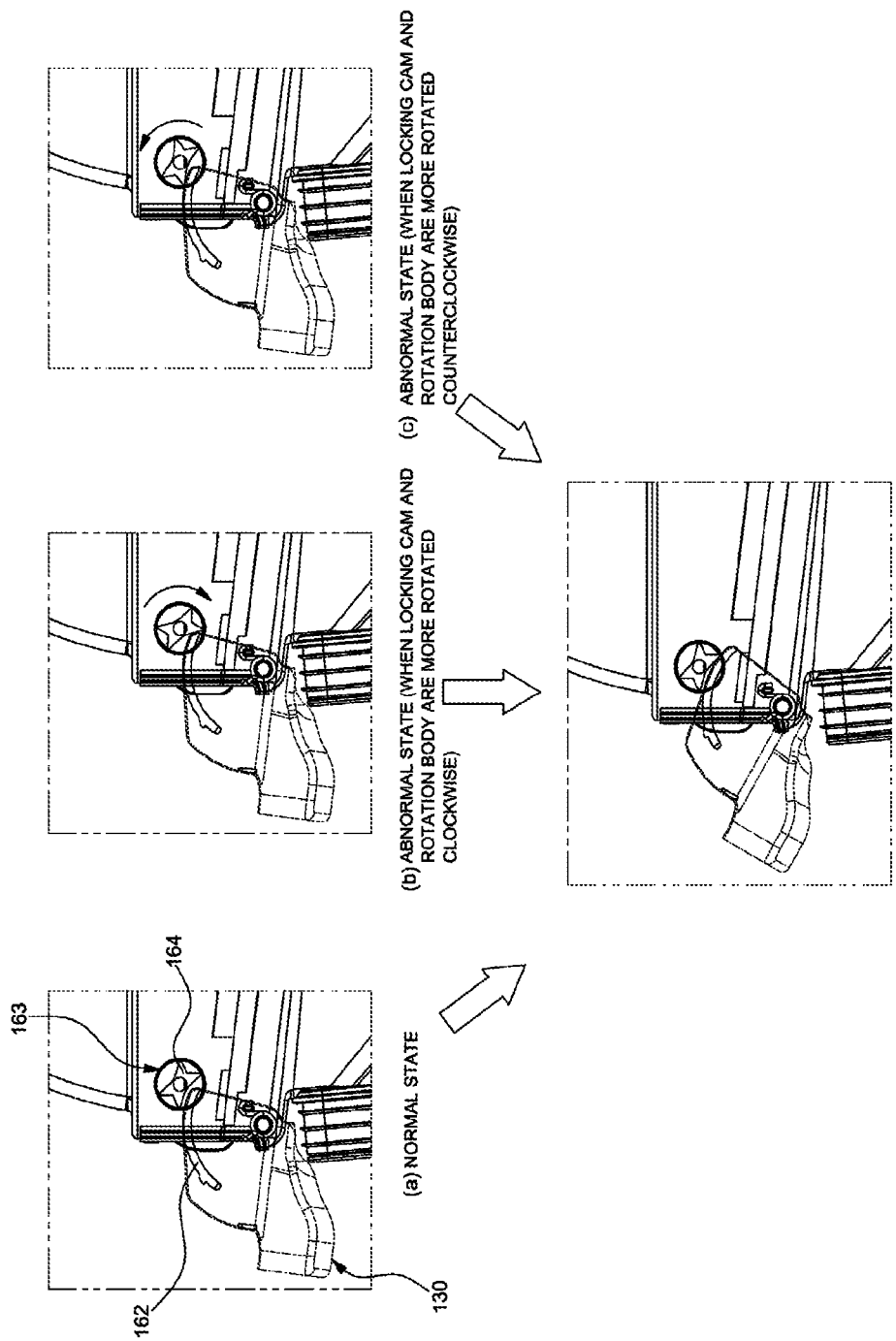

AIR CLEANER FOR VEHICLE

CROSS-REFERENCE TO RELATED PATENT APPLICATION

The present application claims priority of Korean Patent Application Number 10-2013-0093355 filed Aug. 6, 2013 and Korean Patent Application Number 10-2013-0138872 filed Nov. 15, 2013, the entire contents of which application is incorporated herein for all purposes by this reference.

BACKGROUND OF INVENTION

1. Field of Invention

The present invention relates to an air cleaner for a vehicle, and more particularly, to an air cleaner for a vehicle having an improved door locking structure not affected by the temperature of an engine compartment and the air cleaner configured to be capable of performing a door opening/closing operation and a filter replacing operation by simple manipulation.

2. Description of Related Art

In general, intake systems for engines are systems that supply air required in a combustion process to an engine. An intake system for an engine includes an air cleaner that removes foreign substances in the air inhaled into the engine.

Since dust contained in the air or a fine impurity is included in the inhaled air, the inhaled air, dust or impurity of which is removed, must be supplied to a cylinder of the engine.

Thus, an air cleaner that purifies the inhaled air required for the combustion process of the engine is mounted on the intake system for the engine. The air cleaner is fixedly disposed in the intake system for the engine in a state in which a filter element of the air cleaner is hung or inserted between an upper case and a lower case.

Thus, the inhaled air introduced into a case through a duct passes through the filter element inside the air cleaner and then is supplied to the engine via an air hose. Thus, the inhaled air, foreign substances of which are removed by the filter element, is supplied to the cylinder such that the engine shows a high output and abrasion of the engine is prevented.

The filter element of the air cleaner needs to be periodically cleaned or replaced. Thus, an air cleaner that is capable of easily removing and mounting the filter element is required. A drawer type structure, in which the filter element can be inserted/removed into/from an inside of the case in a slide manner, has been proposed.

Prior-art documents 1 and 2 disclose constructions in which a filter element of an air cleaner can be inserted/removed into/from an inside of a case simply in a drawer manner without disassembling the case so that an operation of replacing the filter element can be easily performed.

However, air cleaners disclosed in prior-art documents 1 and 2 use additional frames (prior-art document 1: a frame at which a handle is installed, prior-art document 2: a drawer type case) having drawer shapes for fixing the filter element, and require a fixing unit for fixing the frame on which the filter element is mounted, to the case (upper/lower housing or case).

Since the air cleaners disclosed in prior-art documents 1 and 2 each have a structure using the frame, the number of operations when the filter element is replaced with a new one is large. That is, the frame must be taken out from the case and then the filter element must be removed from the frame, a new filter element must be mounted on the frame again and then, the frame must be inserted into the case.

In this procedure, the air cleaner disclosed in prior-art document 2 further requires a cumbersome procedure of releasing a fixed state of a ring-shaped holder that is a fixing unit, replacing the holder with a new one and then fixing the new holder again.

Furthermore, since directivity in which the filter element must be mounted in a predetermined direction, exists in a direction in which the filter element is to be mounted, convenience in the replacing operation is lowered.

Prior-art document 3 discloses an air cleaner having a frame structure using a link unit in which an operation of replacing a filter assembly including a filter element can be easily performed. The air cleaner disclosed in prior-art document 3 includes a door that opens/closes an entrance of a case and the link unit that causes the filter element to closely contact the case or to release the close-contact state of the filter assembly while being interlocked with a rotation operation of the door.

A hook-shaped clamp is formed integrally with the door so as to maintain a closed state. The clamp is fastened to a hanging jaw of an upper case and thus the door can be maintained in the closed state.

A coupling protrusion that protrudes laterally and a gasket (rubber seal) that is formed of a rubber material and is long installed to surround the coupling protrusion are provided at an outer side of the frame of the filter assembly. The gasket closely contacts an inner side of the case and a horizontal link so that airtightness can be maintained.

In the air cleaner disclosed in prior-art document 3, when the door is opened, a state in which the filter assembly closely contacts the case, is released, and the filter assembly can be easily removed from the case in the slide manner. Subsequently, when a new filter assembly is accommodated in the case and is coupled to the link unit and then the door is closed, the filter assembly is automatically in close contact with the case and is fixed thereto.

However, in the above-mentioned air cleaners, when the temperature of the engine rises, the clamp formed of a plastic material expands by heat such that a coupling force to the hanging jaw may be lowered. As a result, the fixed state of the filter assembly is released when the door is opened due to vibration.

A process of opening the door by releasing the hung state of the clamp is inconvenient (the number of processes is large), the coupling protrusion and the gasket have a complicated coupling structure, and friction between the gasket (that is long installed in all sections of the coupling protrusion in a lengthwise direction), the inner side of the case and the link is large such that the door and the link are not easily moved when the door is opened (there is a sense of tightness).

The information disclosed in this Background section is only for enhancement of understanding of the general background of the invention and should not be taken as an acknowledgement or any form of suggestion that this information forms the prior art already known to a person skilled in the art.

BRIEF SUMMARY

The present invention provides an air cleaner for a vehicle having an improved door locking structure that is not affected by the temperature of an engine compartment.

The present invention also provides an air cleaner for a vehicle that is capable of performing a door opening/closing operation and a filter replacing operation by simple manipulation.

According to an aspect of the present invention, there is provided an air cleaner for a vehicle, the air cleaner including: a filter assembly that is accommodated in a case and removes foreign substances in air; a case having an accommodation space of the filter assembly and an entrance through which replacement of the filter assembly is performed; a door rotatably installed at the case and opens/closes the entrance of the case; an elastic member that is mounted between the door and the case so as to apply an elastic restoring force to the door in an opened direction; and a locking unit that is installed between the door and the case, locks the door at a predetermined closed position and unlocks the door by one touch manipulation of pressing the door at the closed position so as to rotate the door.

The air cleaner may further include a link unit including opposing ends rotatably installed to the case and the door, respectively, wherein the link unit causes the filter assembly to closely contact the case and to release the close-contact state of the filter assembly while being interlocked with rotation of the door.

Here, the link unit may include: a first link, one end of which is rotatably coupled to the case; and a second link, both ends of which are rotatably coupled to the first link and the door and which causes the filter assembly to closely contact an inner side of the case when the door is closed.

The second link may push a coupling protrusion that protrudes from a frame of the filter assembly, so as to cause the filter assembly to closely contact the inner side of the case.

Rubber seals that contact the second link may be installed in a partial section of the coupling protrusion in a lengthwise direction, and protrusion parts may be integrally formed in the remaining section of the coupling protrusion in which no rubber seal is installed, so as to reduce friction between the second link and the coupling protrusion.

The locking unit may be configured between a case side part and a door side part that surrounds the case side part, so as to selectively perform door locking/unlocking depending on a rotation position of the door.

The locking unit may lock the door by one touch manipulation of pressing the door closed up to the closed position, more rotating the door and then releasing the pressed state of the door.

The locking unit may include: protrusions that protrude from the door; and a rotation body that is rotatably installed at the case and is selectively rotated, rotation-confined and confinement-released due to the protrusions depending on the rotation position of the door, wherein, when the rotation body is rotation-confined due to the protrusions of the door at the closed position, door locking is performed.

A locking cam to which the protrusions of the door are locked, may protrude from the rotation body, and the protrusions of the door may push sides of the locking cam so as to rotate the rotation body and may locked to the locking cam so as to confine rotation of the rotation body.

The protrusions of the door may include: a pressing protrusion that, when the door is rotated, pushes the sides of the locking cam so as rotate the rotation body; and a locking protrusion that, when the door is rotated, pushes the sides of the locking cam so as to rotate the rotation body and that is locked to the sides of the locking cam in an engaging manner.

The pressing protrusion and the locking protrusion may sequentially push the sides of the locking cam so as to rotate the locking cam and the rotation body in one direction while the door is rotated in a backlash section that is more pressed than the closed position.

The pressing protrusion may push the sides of the locking cam while the door is pressed at the closed position, and the locking protrusion may push the sides of the locking cam while the door is pressed at the closed position and then is rotated by an elastic member in an opened direction.

The locking cam may include protrusion-shaped protrusion ends in which locking to the locking protrusion is performed, and groove parts that are formed between two adjacent protrusion ends and push the pressing protrusion and the locking protrusion, and a hanging jaw may be formed at the locking protrusion in such a way that the hanging jaw is hung in each of the protrusion ends of the locking cam and locking is performed in an engaging manner.

The locking cam may include four protrusion ends that protrude from the sides of the locking cam and four groove parts formed between two adjacent protrusion ends.

The protrusion ends and the groove parts of the locking cam may be symmetrically formed with respect to at least one axial line that passes through a rotation center of the locking cam.

While the door is rotated in the backlash section in which the door is more pressed than the closed position, the pressing protrusion and the locking protrusion may sequentially push one of the groove parts placed at an interval of 180° in opposite directions so as to rotate the locking cam and the rotation body in one direction.

The locking protrusion may have a long-extending shape in which the rotation body and the locking cam are capable of being regulated to a defined rotation position and a defined rotation angle.

The locking protrusion may be long formed to have an arc shape around a hinge coupling part that is a rotation center of the door.

The locking protrusion may have a long shape in which at least a portion of all lengthwise sections of the locking protrusion is placed at a lateral position of the locking cam in which rotation of the locking cam is capable of being regulated, while the door is rotated in an open direction and in a closed direction.

A hanging jaw, in which each of the protrusion ends of the locking cam is hung and locking is performed in an engaging manner, may be formed at a front end of the locking protrusion.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 19(*a*), FIG. 19(*b*) and FIG. 19(*c*) illustrate states in which deviations occur in rotation directions at rotation positions of the rotation body illustrated in FIGS. 16A and 16B.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
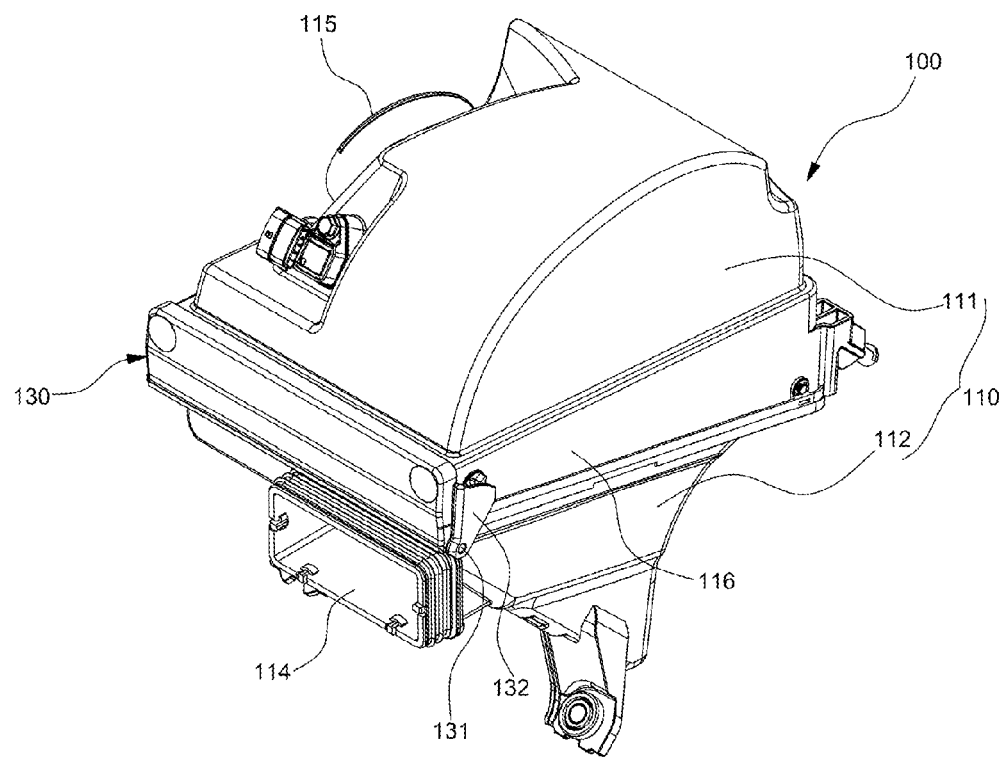
FIG. 1 is an assembling perspective view of an exemplary air cleaner for a vehicle according to the present invention.
Figure 2:
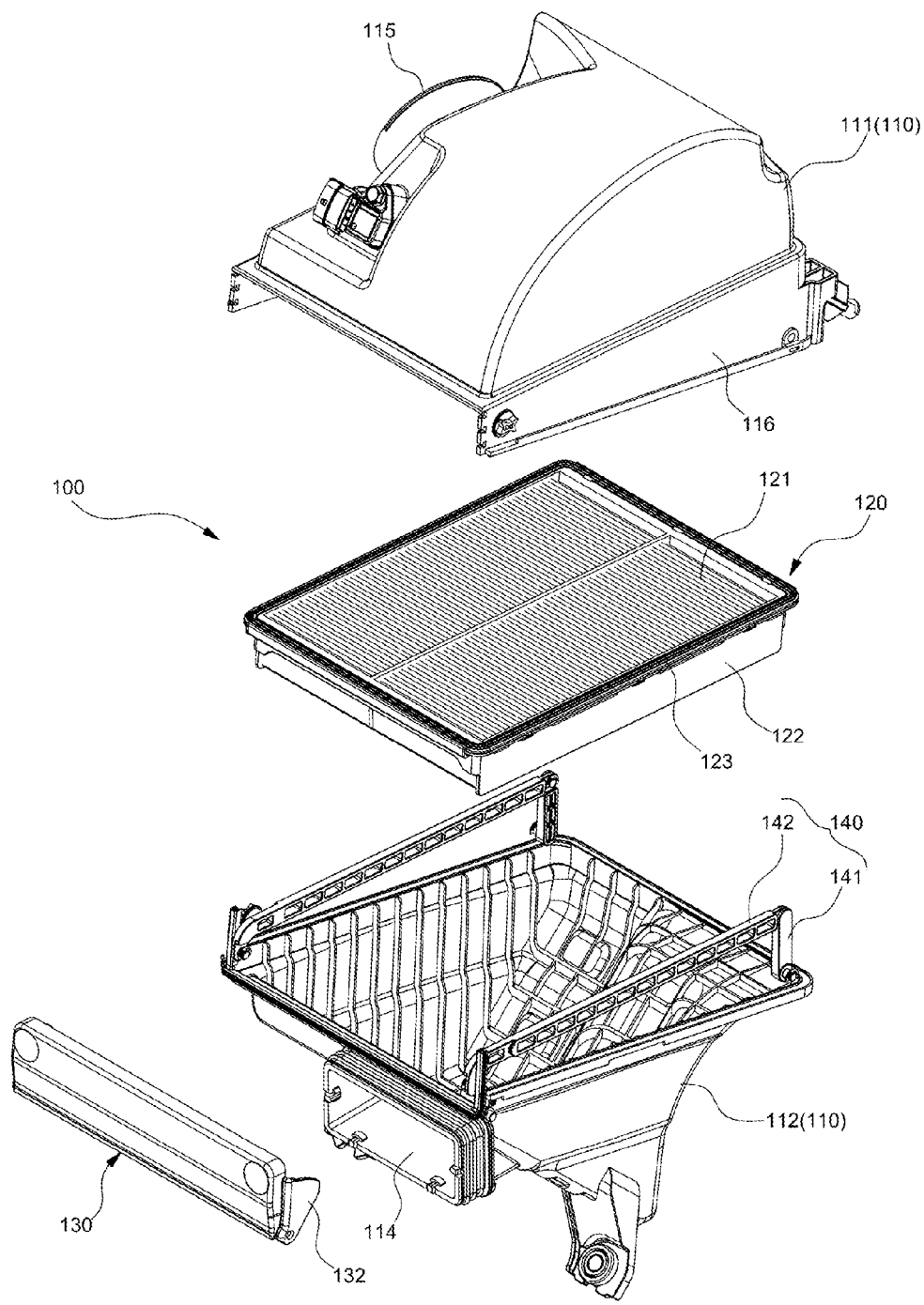
FIG. 2 is an exploded perspective view of the air cleaner for the vehicle illustrated in FIG. 1.
Figure 3:
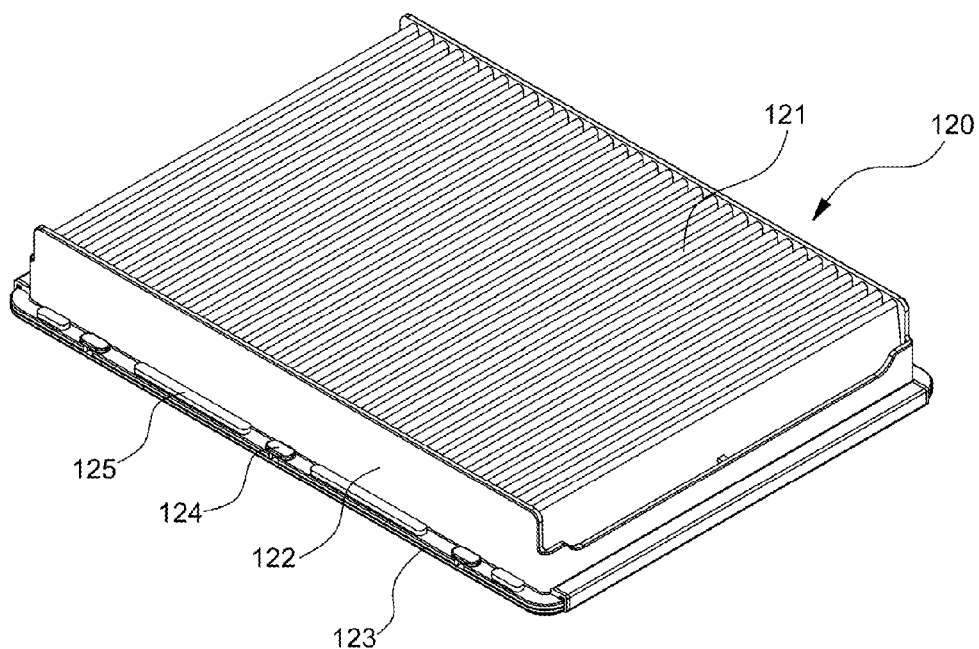
FIG. 3 is a bottom perspective view illustrating a filter assembly of the air cleaner for the vehicle of FIG. 1.

FIG. 1 is an assembling perspective view of an air cleaner for a vehicle according to various embodiments of the present invention, FIG. 2 is an exploded perspective view of the air cleaner for the vehicle illustrated in FIG. 1, and FIG. 3 is a bottom perspective view illustrating a filter assembly of the air cleaner for the vehicle of FIG. 1.

Figure 4:
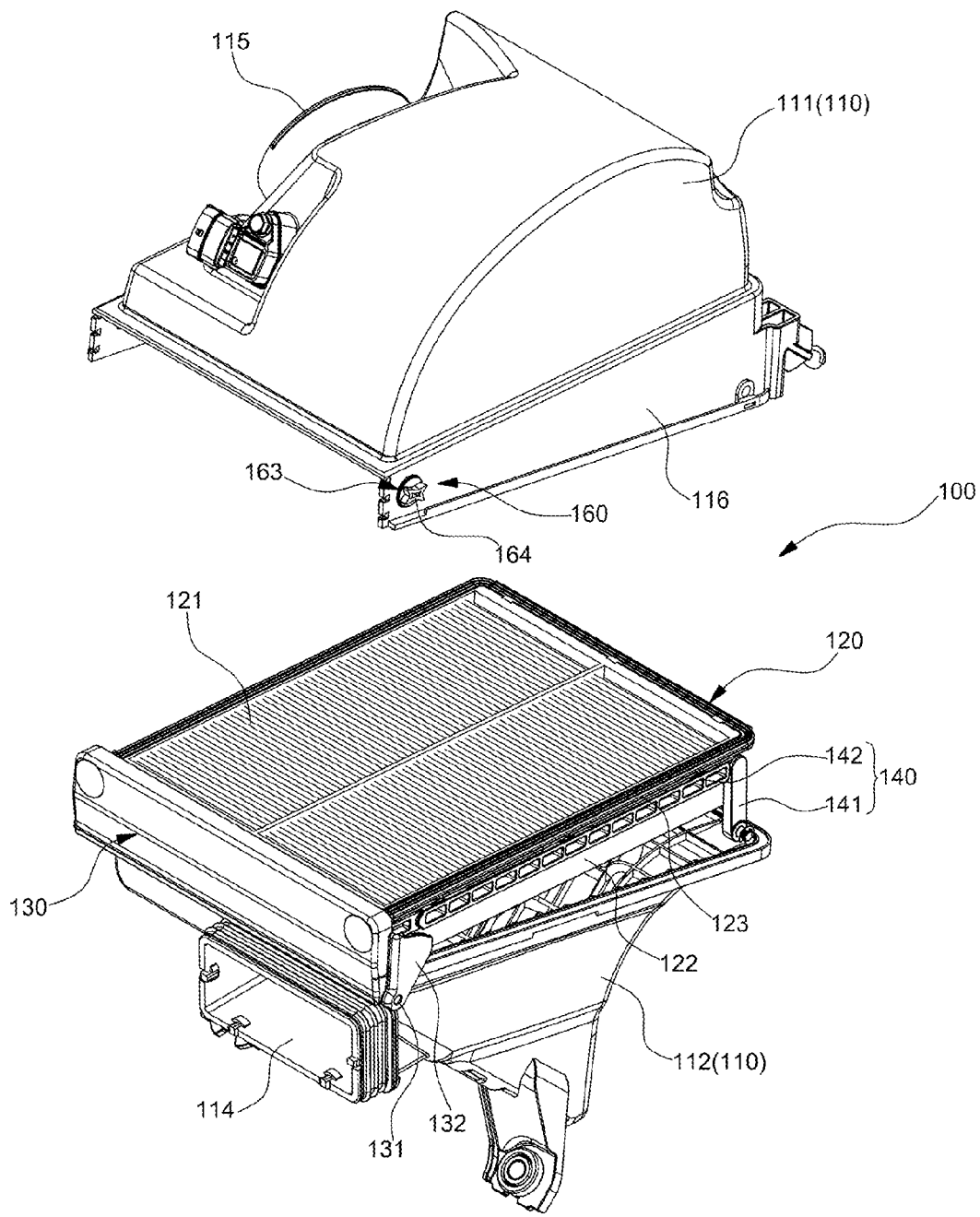
FIG. 4 is a perspective view illustrating the state of a link unit and the state of the filter assembly of the air cleaner for the vehicle of FIG. 1 when a door is closed.

FIG. 4 is a perspective view illustrating the state of a link unit and the state of the filter assembly of the air cleaner for the vehicle of FIG. 1 when a door is closed, wherein an upper case is separated from the air cleaner for the vehicle of FIG. 1.

Figure 5:
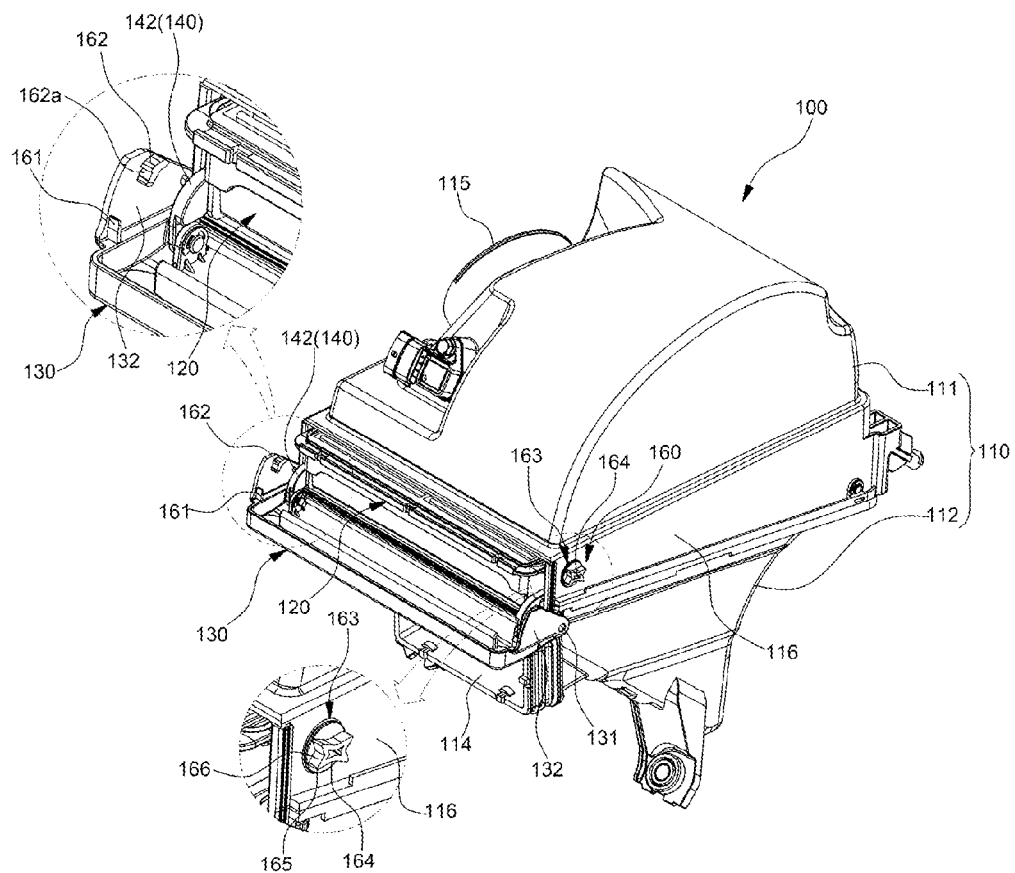
FIG. 5 is a perspective view of a door-opened state for illustrating a configuration of a locking unit of the air cleaner for the vehicle of FIG. 1

FIG. 5 is a perspective view of a door-opened state for illustrating a configuration of a locking unit of the air cleaner for the vehicle of FIG. 1, and FIGS. 6 through 15 are views illustrating an operating state of the air cleaner for the vehicle of FIG. 1 depending on a position of the door.

As illustrated in FIGS. 1 through 15, an air cleaner 100 for a vehicle according to various embodiments of the present invention includes a filter assembly 120 that is accommodated in a case 110 and removes foreign substances in inhaled air, the case 110 having an accommodation space of the filter assembly 120 and an entrance through which replacement of the filter assembly 120 is performed, a door 130 that opens/closes the entrance of the case 110, a link unit 140 that causes the filter assembly 120 accommodated in the case 110 to closely contact the case 110 or to release the close-contact state of the filter assembly 120 while being interlocked with rotation of the door 130, an elastic member (reference numeral 150 in FIG. 6) that applies an elastic restoring force to the door 130 in an opened direction, and a locking unit 160 that locks and fixes the door 130 at a closed position and unlocks the door 130 by manipulation of pressing the door 130 more at the closed position in a closed direction.

In the above construction, the filter assembly 120 includes a filter element 121 and a frame 122 that fixes the filter element 121, and a coupling protrusion 123 that protrudes laterally is provided at a top end of sides of the frame 122 (see FIGS. 3 and 4).

The coupling protrusion 123 has a laterally-protruding structure and is formed long forward and backward along both left-and-right sides of the frame 122, each of rubber seals 124 having a predetermined size is installed at a bottom surface of the coupling protrusion 123, and protrusion parts 125 are integrally formed in the remaining section of the bottom surface of the coupling protrusion 123 in which no rubber seal 124 is formed. One will appreciate that such integral components may be monolithically formed.

The bottom surface of the coupling protrusion 123 at which the rubber seals 124 and the protrusion parts 125 are installed, is a surface that the link unit 140 contacts and supports when the door 130 is closed, i.e., a frame surface that a second link 142 of the link unit 140 that will be described below contacts, pushes and supports so as to cause the filter assembly 120 to closely contact or to release the close-contact state of the filter assembly 120.

An improved structure of the rubber seals 124 and the protrusion parts 125 of the present invention and effects thereof have relation with operating states of the door 130 and the link unit 140 and thus will be described below in detail.

The case 110 includes an upper case 111 and a lower case 112 that are fastened to and coupled to each other by a fastening unit. An outlet 115 to which an air hose is connected, is formed in the upper case 111, and an inlet 114 to which a duct is connected, is formed in the lower case 112.

The filter assembly 120 is approximately horizontally disposed in the internal space of the case 110, i.e., in the accommodation space formed by the upper case 111 and the lower case 112. Thus, air inhaled through the duct passes through the filter assembly 120 inside the case 110 and is supplied to the engine via the air hose. Foreign substances in the air are removed while inhaled air passes through a filter element 121 of the filter assembly 120.

The entrance through which the filter assembly 120 is inserted/taken out into/from the case 110 during replacement, is formed on a front side of the upper case 111 and the lower case 112, and the door 130 that opens/closes the entrance is installed.

The door 130 is rotatably coupled to an outer side of the case 110 through a hinge coupling part 131 at a lower end of the door 130 and is vertically rotated based on the hinge coupling part 131 at the lower end thereof so as to open/close the entrance at the front side of the case 110.

A link unit 140, both ends of which are rotatably coupled to an inner side of the door 130 and an inner side of the case 110 and which will be interlocked with a rotation operation of the door 130, is configured between the door 130 and the case 110. In this case, two link units 140 having the same configuration are placed at both left-and-right sides of the filter assembly 120 accommodated in the case 110.

In this case, each link unit 140 includes a first link 141, a lower end of which is rotatably coupled to the inner side of the case 110, and a second link 142, a rear end of which is rotatably coupled to a top end of the first link 141 and a front end of which is rotatably coupled to the inner side of the door 130 (see FIGS. 2 and 4).

The first link 141 inside the case 110 is approximately vertically long disposed close to a case side part 116, and the second link 142 inside the case 110 is long forward and backward disposed close to the case side part 116 so that the rear end of the second link 142 may be rotatably coupled to the first link 141 and the front end of the second link 142 may be rotatably coupled to the door 130.

The second link 142 is a link that causes the filter assembly 120 to closely contact the inner side of the case 110 when the door 130 is closed. The second link 142 is approximately horizontally long disposed inside the case 110, and the front end of the second link 142 is downwardly bent. Thus, a lower end of the bent part of the second link 142 is rotatably hinge-coupled to the door 130.

Thus, when the door 130 is opened, the second link 142 is forwardly pulled by the door 130, and the first link 141 is forwardly rotated by the second link 142 based on the hinge coupling part 131 to the case 110. When the door 130 is closed, the second link 142 is backwardly pushed by the door 130, and the first link 141 is rotated by the second link 142 in an opposite direction, i.e., backwardly based on the hinge coupling part 131.

Also, when the door 130 is opened, the second link 142 that is approximately horizontally long disposed is forwardly pulled by the door 130, is downwardly inclined and descends. Conversely, when the door 130 is closed, the second link 142 having the rear end supported by the first link 141 is backwardly pushed by the door 130 and simultaneously ascends again and is in a horizontal state.

The link unit 140 serves to ascend or descend the filter assembly 120 that is driven while being interlocked with the opening/closing operation of the door 130 and that is accommodated in the case 110 (the second link 142 supports the filter assembly 120 through the coupling protrusion 123). Also, the link unit 140 causes the filter assembly 120 to closely contact the inner side of the case 110 and to fix the filter assembly 120 to the case 110 in a state in which the door 130 is closed.

In this case, the ascending second link 142 causes the coupling protrusion 123 of the filter assembly 120 to be lifted and causes the filter assembly 120 to closely contact the inner side of the case 110.

Once the door 130 is rotated in the opened direction and the second link 142 starts descending, a pressurizing force of the second link 142 is released and thus the close-contact and fixed state of the filter assembly 120 is released.

In more detail, in the air cleaner 100 for the vehicle according to various embodiments of the present invention, when the door 130 is fully opened and the filter assembly 120 is inserted into the case 110 in a slide manner, the filter assembly 120 is put on an internal hanging side (side in which edges of a lower end of the frame 122 are hung and supported) of the case 110 (lower case) in an initially-inserted state.

In this case, when the door 130 is closed (is rotated in a closed direction), a top surface of the second link 142 that ascends while being interlocked with a closing operation of the door 130 contacts a bottom surface of the coupling protrusion 123, and subsequently, the second link 142 that ascends when the door 130 is continuously closed, causes the filter assembly 120 to be lifted.

The top surface of the second link 142 that ascends while being interlocked with the closing operation of the door 130 causes the coupling protrusion 123 to be lifted and causes the entire part of the filter assembly 120 to be lifted, and from this time point, the second link 142 and the filter assembly 120 ascend together.

Next, when the door 130 is fully closed, the second link 142 pressurizes the coupling protrusion 123 upwardly so that a top surface of the frame 122 closely contacts and is fixed to the inner side (side in which edges of a top end of the frame are hung) of the case 110 (upper case). Thus, the position of the filter assembly 120 can be fully fixed.

Also, since the second link 142 is forwardly pulled and simultaneously descends while the door 130 is opened (while the door 130 is rotated in the opened direction), the close-contact and fixed state of the filter assembly 120 supported by the second link 142 to the case 110 is also released and then, the second link 142 descends slightly.

Next, a bottom surface (a bottom surface of the frame 122) of the filter assembly 120 first contacts the internal hanging side of the case 110 (lower case). Subsequently, while the door 130 is more opened, the second link 142 is separated from the coupling protrusion 123 of the filter assembly 120 and then is pulled by the door 130 and additionally descends.

As a result, when the door 130 is fully opened, the front end of the second link 142 including the bent part is fully pulled by the door 130 and protrudes from an outer side of the case 110. In this case, a user may take out the filter assembly 120 from the case 110.

Next, the elastic member 150 and the locking unit 160 are elements for implementing a one touch manipulation method, whereby the door 130 can be locked/unlocked by manipulation of pressing the door 130 once so as to open/close the door 130. In the air cleaner 100 for the vehicle according to various embodiments of the present invention, the door locking and unlocking operation and the door opening operation can be automatically performed by the elastic member 150 and the locking unit 160 by one touch manipulation of the door 130, and the door one touch manipulation method increases user's convenience.

Here, in the one touch manipulation method, when the door 130 in the closed state is once pressed and then released, the door 130 is unlocked and is automatically opened, and even when the door 130 is closed, the door 130 is more pressed and then is released so that the door 130 passes through a predetermined closed position (a position at which the door 130 is locked later), the door 130 is automatically locked.

In the present invention, the door opening/closing operation means an operation in which the door 130 is rotated so that the entrance of the case 110 may be opened/closed.

The closed position of the door 130 means a predetermined position at which the door 130 closes the entrance of the case 110. The door 130 is locked by the locking unit 160 at the closed position, and the door 130 is at the closed position until additional pressing manipulation is performed in the locked state.

Hereinafter, the closed position defined in the present specification so as to clearly describe the present invention includes a door position that is the same as the locked position even when the door 130 is not locked, in addition to a door position at which locking is performed.

The air cleaner 100 for the vehicle according to various embodiments of the present invention requires manipulation of pressing the door 130 more at the closed position so as to open/close the door 130. Hereinafter, in the present specification, a door rotatable section from the door closed position to a position at which the door 130 is pressed to the maximum is referred to as a backlash section.

When the door 130 is more pressed at the closed position while one touch manipulation is performed, the door 130 is rotated in the backlash section. Rotation of the door 130 in the opened direction that will be performed after pressing manipulation is released in the backlash section, is automatically performed by the elastic restoring force of the elastic member (reference numeral 150 in FIGS. 5 through 15).

The elastic member 150 is a member that applies the elastic restoring force to the door 130 in the opened direction. The elastic member 150 is installed between the door 130 and the case 110 so that the elastic restoring force in which the door 130 can be automatically rotated in the opened direction without an external force can be provided.

The elastic member 150 causes the door 130 to be automatically opened. Furthermore, the elastic member 150 causes the door 130 on which pressing manipulation is performed when the door 130 is closed, to be restored and rotated from the backlash section to the closed position.

The elastic member 150 may be a coil spring that is mounted on each hinge coupling part 131 of both left-and-right sides of the door 130 and has one end and the other end fixed to the door 130 and the case 110, respectively. The elastic member 150 is deformed to have the elastic restoring force when the door 130 is rotated in the closed direction and then rotates the door 130, an external force or hanging action (locking action) of which is released, in the opened direction.

Next, the locking unit 160 is configured to automatically lock and fix the door 130 so that the door 130 at the closed position may not be rotated in the opened direction when the door 130 is rotated to be closed. The locking unit 160 is also configured to automatically release a locked state of the door 130 when manipulation of pressing the door 130 in the locked state is performed at the closed position.

The locking unit 160 is disposed between a door side part 132 formed to surround an outer side of the case side part 116 and the case side part 116. The locking unit 160 having the same configuration is installed between both left-and-right side parts of the door 130 and both left-and-right side parts of the case 110.

Each locking unit 160 includes protrusions 161 and 162 that protrude from an inner side of the door side part 132 and a rotation body 163 from which a locking cam 164 integrally protrudes and which is rotatably mounted on an outer side of the case side part 116. One will appreciate that such integral components may be monolithically formed.

In the locking unit 160 having this configuration, the rotation body 163 is selectively rotated, confined and confinement-released due to the protrusions 161 and 162 depending on a position at which the door 130 is rotated. In particular, when the rotation body 163 is rotation-confined by the protrusion 162 of the door 130 at the closed position, door locking is performed.

The protrusions 161 and 162 contact sides of the locking cam 164 and push the locking cam 164 so as to rotate the rotation body 163. At a set rotation position of the rotation body 163, the protrusions 161 and 162 are locked to the sides of the locking cam 164 in an engaging manner and confine rotation of the rotation body 163 and simultaneously fix the position of the door 130.

In various embodiments of the present invention, the protrusions 161 and 162 include two protrusions formed at the door side part 132, i.e., a pressing protrusion 161 that, when the door 130 is rotated, pushes the sides of the locking cam 164 so as to rotate the rotation body 163, and a locking protrusion 162 that, when the door 130 is rotated, pushes the sides of the locking cam 164 so as to rotate the rotation body 163 and that is locked to the sides of the locking cam 164 in the engaging manner. The pressing protrusion 161 and the locking protrusion 162 may be disposed at positions at which they face each other based on the locking cam 164.

A hanging jaw 162a in which each of protrusion ends 165 of the locking cam 164 is hung, is formed on the locking protrusion 162. Thus, each protrusion end 165 of the locking cam 164 is inserted into and hung in the hanging jaw 162a of the locking protrusion 162 so that engaging between the locking protrusion 162 and the locking cam 164 may be performed. Due to the engaging, the locking cam 164 and the rotation body 163 are confined not to be rotated by the locking protrusion 162 and simultaneously, the locking protrusion 162 is locked to the locking cam 164.

Since the pressing protrusion 161 and the locking protrusion 162 are formed at the door 130, when the door is rotated, two protrusions cause the locking cam 164 to be rotated, or locking of the locking protrusion 162 is performed. Thus, the rotation body 163 formed at the locking cam 164 is rotated while being interlocked with rotation of the door 130, or locking between the locking cam 164 and the locking protrusion 162 is performed.

Since the locking protrusion 162 is formed at the door 130, locking between the locking protrusion 162 and the locking cam 164 is performed. Then, rotation of the rotation body 163 is confined, rotation of the door 130 is also confined and the door 130 is fixed so that a door-locked state can be established.

Since relative positions of the pressing protrusion 161 and the locking protrusion 162 with respect to the locking cam 164 vary depending on the position of the door 130, each of the pressing protrusion 161 and the locking protrusion 162 pushes the locking cam 164 while being in slide contact therewith, or separation or locking between the pressing protrusion 161, the locking protrusion 162 and the locking cam 164 is selectively performed.

The locking cam 164 has a shape in which protrusion-shaped protrusion ends 165 and concave groove parts 166 are formed. When the door 130 is rotated, the pressing protrusion 161 and the locking protrusion 162 sequentially contact the groove parts 166 and push the locking cam 164 so that the rotation body 163 can be rotated. Furthermore, when door locking is performed, a predetermined protrusion end of the entire protrusion ends 165 is hung in the hanging jaw 162a of the locking protrusion 162 so that engaging between the locking protrusion 162 and the locking cam 164 can be performed.

In further describing a shape of a profile of the locking cam 164, the locking cam 164 may have a symmetry shape with respect to at least one axial line that passes through a rotation center of the locking cam 164. In this case, four protrusion ends 165 may symmetrically protrude along the sides of the locking cam 164, and four groove parts 166 may be symmetrically formed between the adjacent protrusion ends 165.

Only two predetermined protrusion ends of the entire protrusion ends 165 placed in opposite directions (disposed at an interval of approximately 180°) are hung in the hanging jaw 162a so that locking of the locking protrusion 162 can be performed. If one of two predetermined protrusion ends 165 is hung in the hanging jaw 162a of the locking protrusion 162 and locking is performed when the door 130 is closed, the other one in an opposite direction is hung in the hanging jaw 162a and locking is performed when the door 130 is opened and then is closed next time.

This is because the rotation body 163 is rotated at 180° until the door 130 is opened in the door-closed state and then is again in the closed state.

The rotation body 163 is rotated by two protrusions 161 and 162 only in one predetermined direction. Each of two protrusions 161 and 162 pushes the locking cam 164 through the groove parts 166 so as to rotate the rotation body 163, wherein, while the door 130 is opened, two protrusions 161 and 162 alternately contact each other and push the locking cam 164 once and subsequently, while the door 130 is closed, two protrusions 161 and 162 alternately contact each other in the same sequence and push the locking cam 164 once.

In this way, while the door 130 is once opened/closed, each of two protrusions 161 and 162 contacts the locking cam 164 twice (pushes the locking cam 164) so as to rotate the rotation body 163. Both in cases where the door 130 is opened and closed, while the door 130 is rotated in a section that is more pressed at the closed position, i.e., in the backlash section, the pressing protrusion 161 first contacts the groove parts 166 of the locking cam 164 so as to rotate a predetermined part of the rotation body 163. Subsequently, the locking protrusion 162 contacts the other groove parts 166 of the locking cam 164 so as to more rotate the remaining part of the rotation body 163.

Instant that, when the door 130 is closed, the locking protrusion 162 pushes the locking cam 164 so as to rotate the rotation body 163 and then each protrusion end 165 of the locking cam 164 is hung in the hanging jaw 162a of the locking protrusion 162, rotation of the rotation body 163 is stopped (locked state). From this instant, as the door 130 and the locking protrusion 162 are additionally moved, the door 130 is maintained in the locked state until each protrusion end 165 of the locking cam 164 is separated from the hanging jaw 162a of the locking protrusion 162 and is taken out therefrom.

When the user wants to open the door 130 in the door-closed state, if the door 130 is pressed into the backlash section, the pressing protrusion 161 and the locking protrusion 162 contact two groove parts (long groove parts in the drawings) of the entire groove parts 166 in opposite directions (two protrusions sequentially contact) and push the locking cam 164 (rotation of the locking cam 164 and the rotation body 163 is performed).

Conversely, when the user wants to close the door 130 in the door-opened state, if the door 130 is pressed into the backlash section so as to lock the door 130, the pressing protrusion 161 and the locking protrusion 162 contact the other, two groove parts 166 (short groove parts in the drawings) disposed in opposite directions (two protrusions sequentially contact) and push the locking cam 164 (rotation of the rotation body 163).

That is, the long groove parts among four groove parts 166 in the drawings are used to open the door 130 (each protrusion contacts and pressurizes in the door backlash section), the short groove parts among four groove parts 166 in the drawings are used to close the door 130 (each protrusion contacts and pressurizes in the door backlash section), and the long groove parts are used to avoid an interference between the locking protrusion 162 and the locking cam 164 on a movement trajectory of the locking protrusion 162 when the door 130 is opened or closed.

When the door 130 is opened/closed, the pressing protrusion 161 and the locking protrusion 162 push two groove parts 166 placed in opposite directions at an interval of approximately 180° (each protrusion sequentially contacts and pushes one groove part) so as to rotate the locking cam 164 and the rotation body 163 always in the same direction, wherein, while the door 130 is more pressed at the closed position, the pressing protrusion 161 contacts the groove parts 166 so as to rotate the locking cam 164 and the rotation body 163, and while the door 130 is more pressed than the closed position and then is rotated in the opened direction due to the restoring force of the elastic member 150 (when the door 130 is rotated toward the closed position), the locking protrusion 162 contacts the groove parts 166 so as to rotate the locking cam 164 and the rotation body 163.

An operating state of the door opening/closing operation will be described below with reference to FIGS. 6 through 15.

Figure 9:
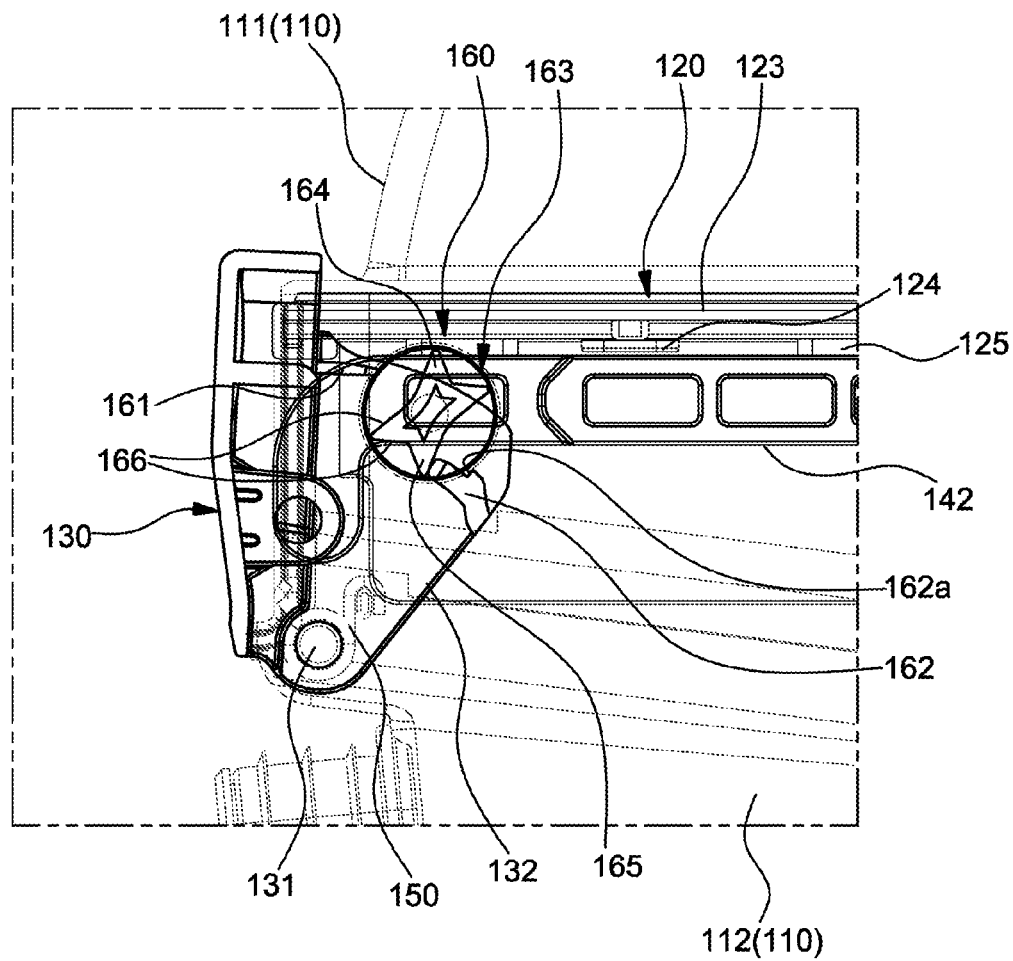
Figure 10:
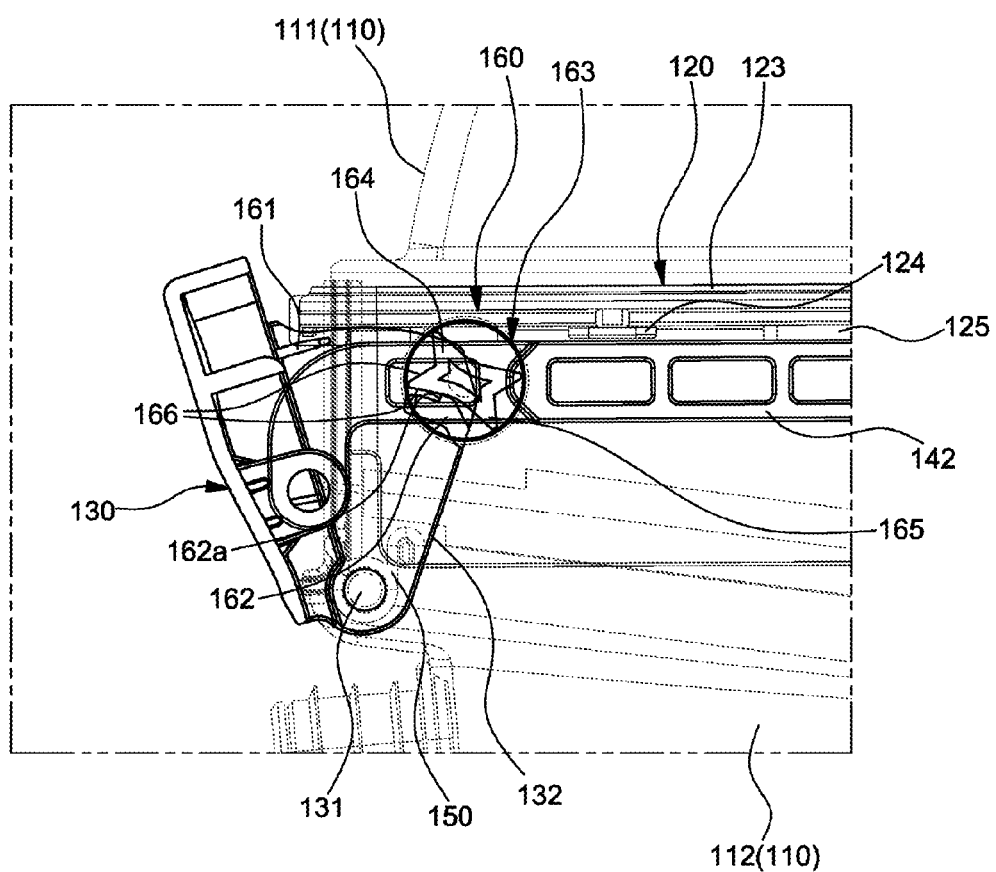
Figure 11:
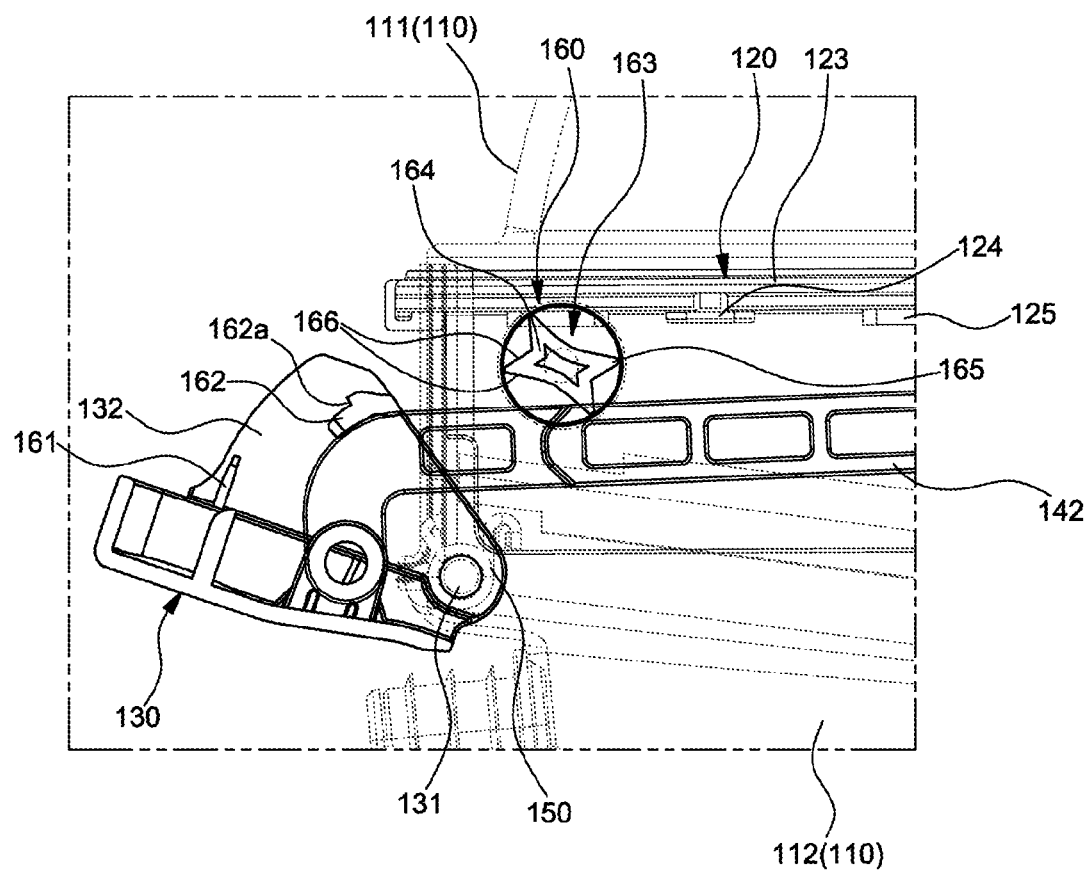

FIGS. 6 through 11 illustrate a state from door-closed and locked states to a door-opened state, and FIGS. 12 through 15 illustrate a state in which the door 130 is closed in the door-opened state of FIG. 11, passes through the backlash section and then door locking is performed.

Figure 6:
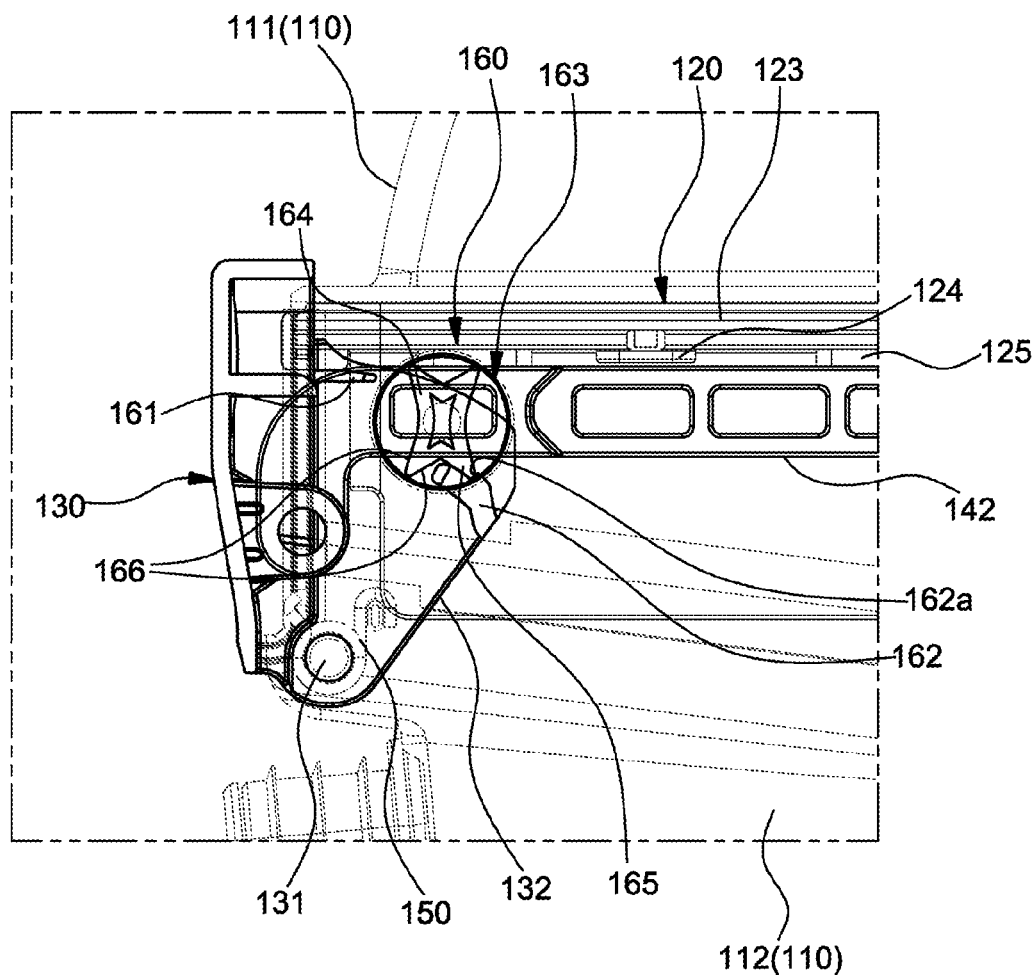
FIG. 6, FIG. 7, FIG. 8, FIG. 9, FIG. 10, FIG. 11, FIG. 12, FIG. 13, FIG. 14 and FIG. 15 are views illustrating an operating state the air cleaner for the vehicle of FIG. 1 depending on a position of the door.

As illustrated in FIG. 6, in the door-closed and locked states, engaging between the locking protrusion 162 and the locking cam 164 is performed in a state in which one protrusion end 165 of the locking cam 164 is hung in the hanging jaw 162a of the locking protrusion 162.

In this state, the locking cam 164 and the rotation body 163 are confined by the locking protrusion 162 of the door 30 and are not rotated. Since the door 130 is also confined by the locking cam 164 and each protrusion end 165 and is not rotated, the position of the door 130 is fully fixed to the closed state.

Figure 7:
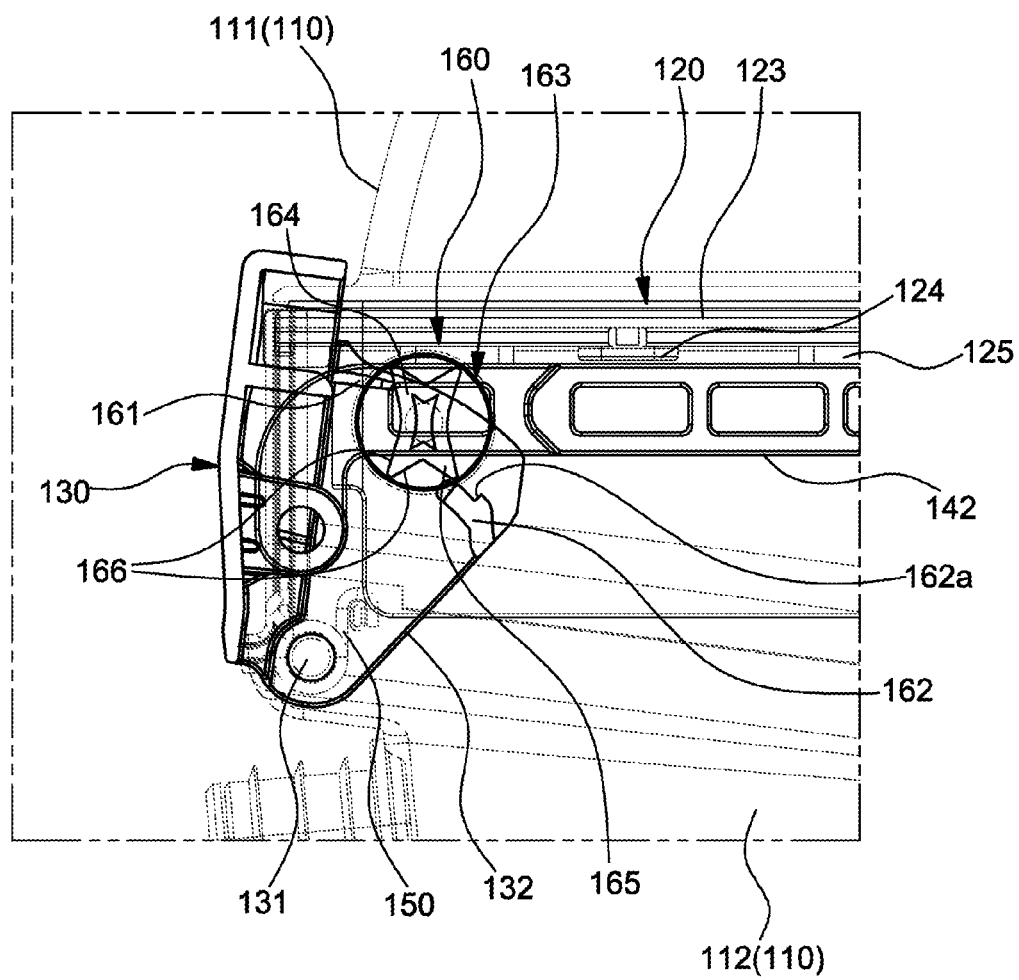

Next, when the user wants to open the door 130, the door 130 needs to be pressed and rotated in the backlash section, as illustrated in FIG. 7. In this case, the locking protrusion 162 descends in the drawings, and each protrusion end 165 of the locking cam 164 is separated from the hanging jaw 162a of the locking protrusion 162.

When the locking protrusion 162 is separated from each protrusion end 165 of the locking cam 164, the pressing protrusion 161 contacts the long groove parts 166 of the locking cam 164. In this state, when the door 130 is more pressed and is additionally rotated, the locking protrusion 162 is separated from the locking cam 164 of the rotation boy 163 and simultaneously, the pressing protrusion 161 pushes the long groove parts 166 of the locking cam 164 and causes the locking cam 164 and the rotation body 163 to be rotated clockwise in the drawings, as illustrated in FIG. 8.

Figure 8:
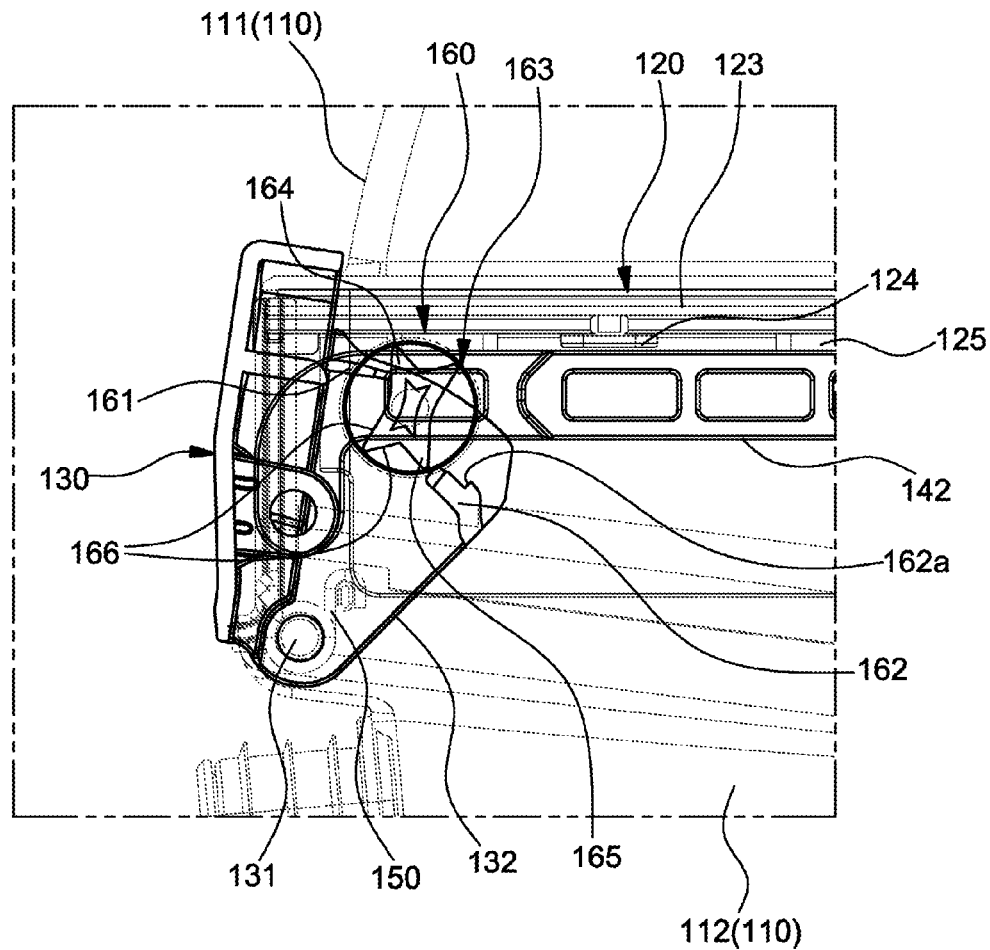

When the pressed state of the door 130 is released (when the user takes a hand off the door 130) in a state in which the locking cam 164 is rotated, as illustrated in FIG. 8, due to the elastic restoring force of the elastic member 150, the door 130 is rotated in the opened direction (counterclockwise in the drawings) that is an opposite direction, and as such, the locking protrusion 162 contacts the long groove parts 166 of the locking cam 164, as illustrated in FIG. 9.

Subsequently, when the door 130 is more rotated in the opened direction, the locking protrusion 162 pushes the long groove parts 166 of the locking cam 164 so as to rotate the locking cam 164 and the rotation body 163 clockwise in the drawings. As a result, as illustrated in FIG. 10, the locking protrusion 162 is not interfered by the locking cam 164, and then, only the door 130 is rotated in the opened direction. Finally, the door 130 is fully opened, as illustrated in FIG. 11.

When the door 130 is opened from the state of FIG. 10 to the state of FIG. 11, the second link 142 is pulled by the door 130 and is forwardly moved and simultaneously descends. In a state in which the door 130 is fully opened, the front end of the second link 142 protrudes toward the outside via the entrance of the case 110, as illustrated in FIG. 11.

While the second link 142 descends, the close-contact and fixed state of the filter assembly 120 to the case 110, the filter assembly being supported by the second link 142 within the case 110, is released and then, the filter assembly 120 descends together with the second link 142. FIG. 10 illustrates a state in which the coupling protrusion 123 of the filter assembly 120 is supported by the second link 142 and descends together.

In the state of FIG. 10, when the door 130 is more opened and the second link 142 descends more, the filter assembly 120 first contacts the internal hanging side of the case 110, and subsequently, while the door 130 is continuously opened, the second link 142 is separated from the coupling protrusion 123 of the filter assembly 120 and descends more and as such, the state of FIG. 11 is established.

Figure 12:
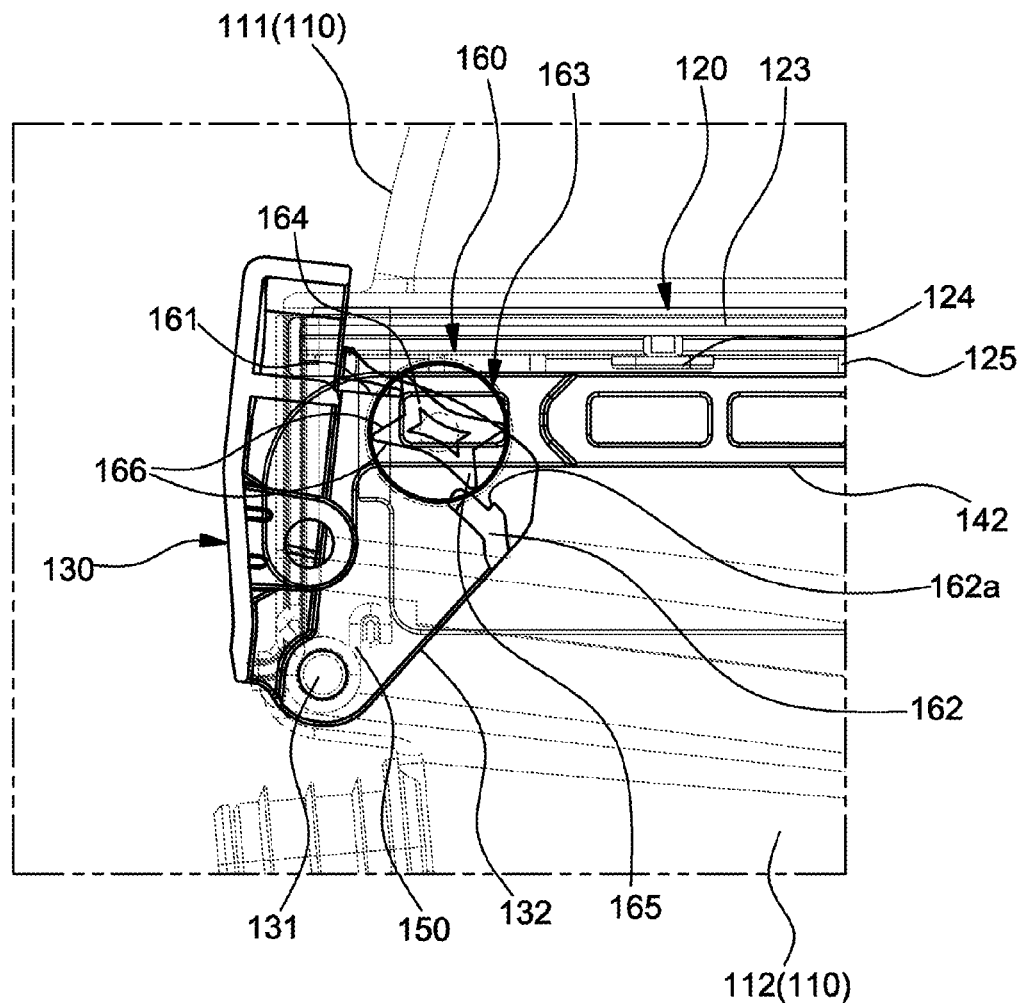
Figure 13:
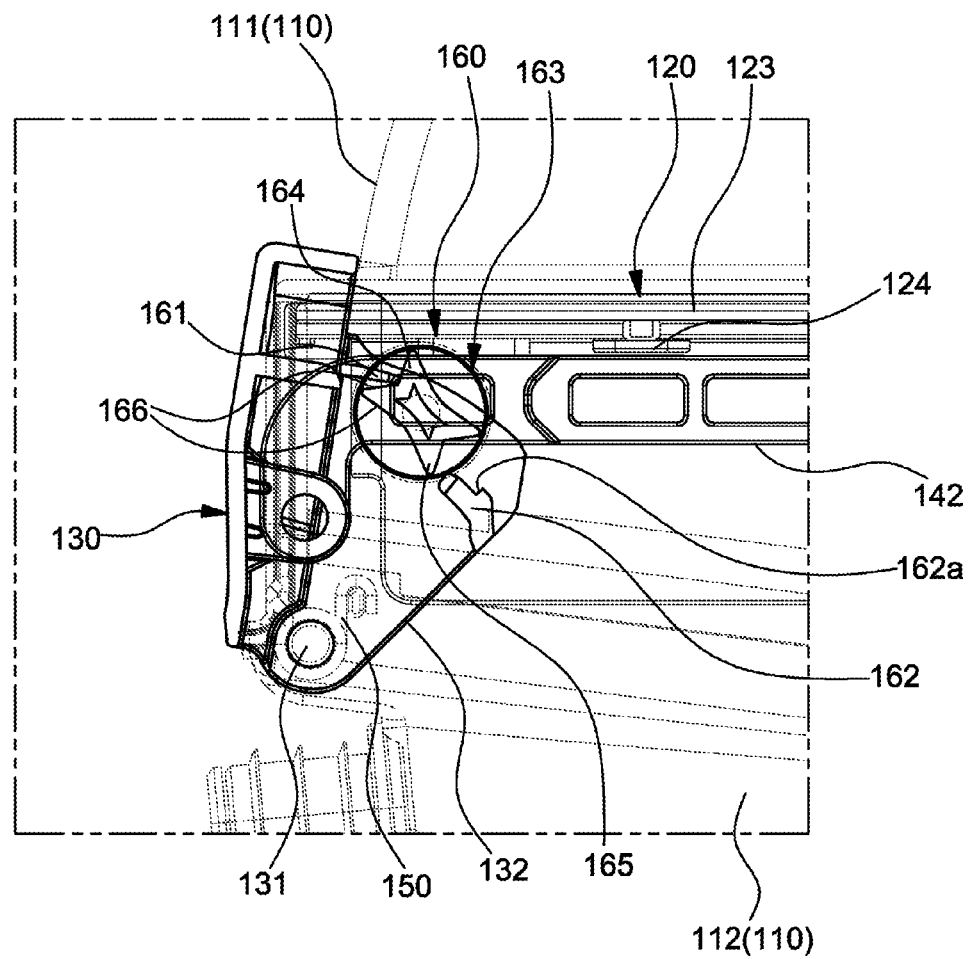
Figure 14:
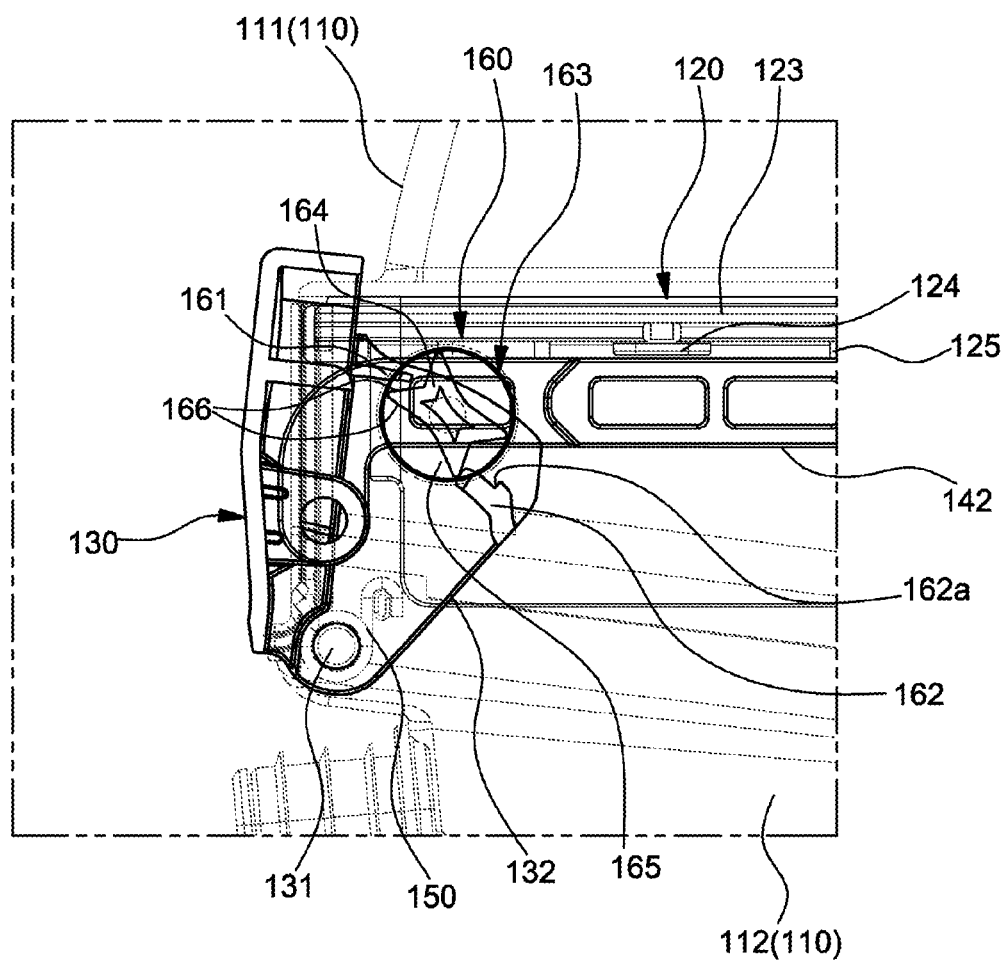

Subsequently, when the user wants to close the door 130 again in the state of FIG. 11 after the filter assembly 120 has been replaced, the door 130 needs to be rotated up to the closed position and then to be more pressed up to the backlash section, as illustrated in FIGS. 12, 13, and 14.

Figure 15:
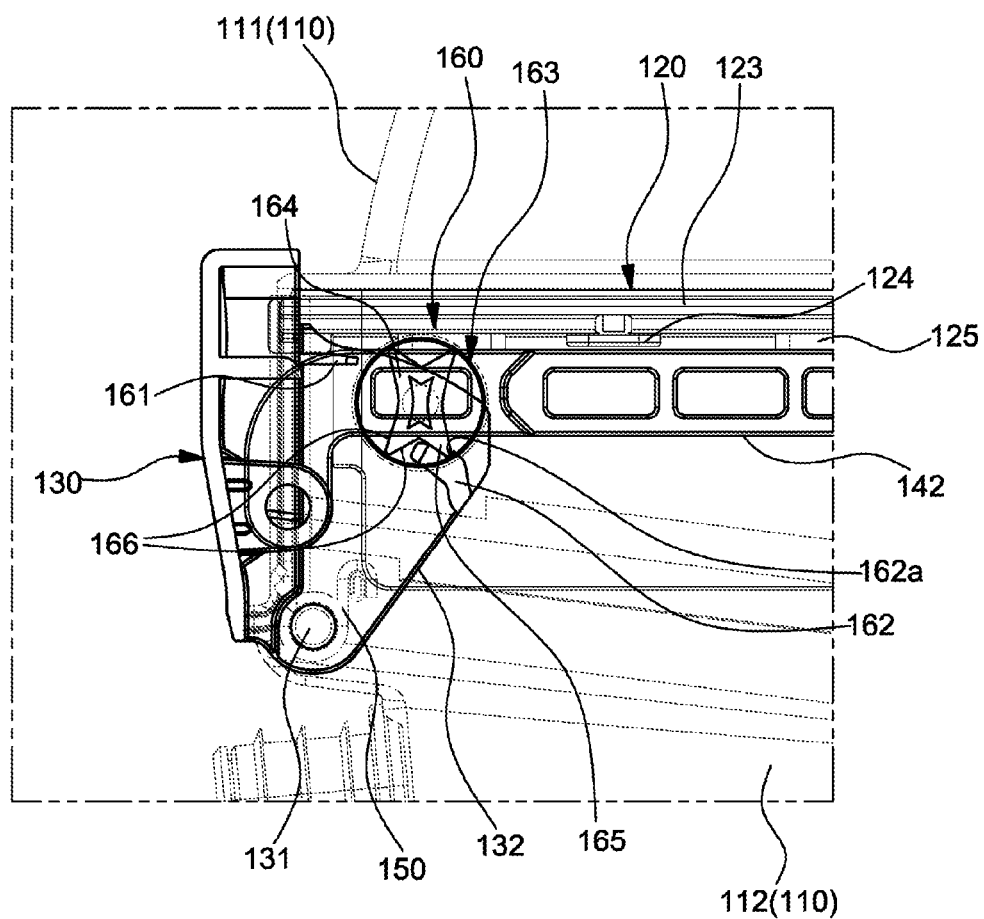

If so, rotation of the locking cam 164 and the rotation body 163 in the backlash section is performed by the pressing protrusion 161 and the locking protrusion 162 and then, finally, a door-locked state of FIG. 15 (rotation body and door fixed state) in which the locking protrusion 162 is again locked by the locking cam 164, is established.

In order to close the door 130, in the state of FIG. 11, the door 130 needs to be upwardly rotated up to the closed position and then the door 130 needs to be more pressed. Subsequently, when the door 130 enters the backlash section, the pressing protrusion 161 first contacts the short groove parts 166 of the locking cam 164, as illustrated in FIG. 12.

Subsequently, as the door 130 is more rotated, the pressing protrusion 161 pushes the short groove parts 166 so as to rotate the locking cam 164 clockwise in the drawings, as illustrated in FIG. 13. When, in the state of FIG. 13, the pressed state of the door 130 is released (when the user takes the hand off the door 130), from this time, the door 130 is rotated in the opposite direction, i.e., in the opened direction (counterclockwise in the drawings) due to the elastic restoring force of the elastic member 150.

In this way, when the door 130 is rotated in the opened direction, the locking protrusion 162 contacts the short groove parts 166 of the locking cam 164, as illustrated in FIG. 14, and subsequently, when the door 130 is more rotated in the opened direction within the backlash section, the locking protrusion 162 pushes the short groove parts 166 of the locking cam 164 so as to rotate the locking cam 164 clockwise in the drawings.

As a result, as illustrated in FIG. 15, when the door 130 reaches the closed position, each protrusion end 165 of the locking cam 164 is hung in the hanging jaw 162a of the locking protrusion 162 and then is again in the door-locked state.

FIGS. 6 and 15 illustrate the door-locked state in which each protrusion end 165 of the locking cam 164 is hung in the hanging jaw 162a of the locking protrusion 162 in the same manner. However, when the next door-closed state after the door-closed state of FIG. 6 is the state of FIG. 15, the protrusion ends 165 of the locking cam 164 hung in the hanging jaw 162a of the locking protrusion in FIGS. 6 and 15 are different protrusion ends 165 placed at an interval of 180° in opposite directions.

The locking cam 164 and the rotation body 163 are rotated at 180° from the state of FIG. 6 to the state of FIG. 15.

When the door 130 is at the position of FIG. 12 in the opened state of FIG. 11, the second link 142 ascends and causes the filter assembly 120 to be lifted, and in the final closed state of FIG. 15, the second link 142 presses the coupling protrusion 123 of the filter assembly 120 so that the filter assembly 120 can fully closely contact and can be fixed to the inner side (hanging side) of the case 110.

Furthermore, when the door 130 is pressed and is backwardly pushed by a size of the backlash section so as to open/close the door 130 (during the states from FIGS. 6 through 10 and during the states from FIGS. 12 through 15), the second link 142 moved while being interlocked with rotation of the door 130 is in slide contact with the frame 122 of the filter assembly 120.

That is, as the second link 142 is moved, the top surface of the second link 142 is in slide contact with the bottom surface of the frame 122 of the filter assembly 120, and a frictional force between the second link 142 and the coupling protrusion 123 in slide contact with each other needs to be minimized in such a way that opening/closing the door 130 can be smoothly and easily performed.

Furthermore, a member that serves as a damper is required to be disposed between the second link 142 and the coupling protrusion 123 of the filter assembly 120 that are separated from each other and then contact each other after the door 130 is opened/closed, and simultaneously, a unit for sealing an inner side of the air cleaner 100 for the vehicle when the door 130 is closed is required.

Thus, each of the rubber seals 124 that serves as a damper when the door 130 is opened/closed and that seals the inner side of the air cleaner 100 for the vehicle when the door 130 is closed, is installed at the bottom surface of the coupling protrusion 123 of the filter assembly 120 only in a predetermined section (see FIG. 3).

In an air cleaner (see prior-art document 3) according to the related art, each of rubber seals (gasket) is long installed in all sections of a coupling protrusion of a frame in a lengthwise direction. However, in this case, a frictional force between the coupling protrusion and a second link may be excessively increased.

Thus, in the air cleaner 100 for the vehicle according to various embodiments of the present invention, each of the rubber seals 124 is installed at the bottom surface of the coupling protrusion 123 to a relatively smaller size, and the protrusion parts 125 integrated with the frame 122 are formed in the section of the coupling protrusion 123 in which no rubber seal 124 is installed, so as to minimize the frictional force between the second link 142 and the coupling protrusion 123.

In this way, the rubber seals 124 that contact the second link 142 are installed not in all sections but only in a partial section of the coupling protrusion 123, and the protrusion parts 125 integrally formed with the frame 122 are formed in the remaining section of the coupling protrusion 123 so that the frictional force between the second link 142 and the coupling protrusion 123 can be reduced when the door 130 and the second link 142 are moved and door opening/closing can be smoothly performed when one touch manipulation is performed.

Meanwhile, according to various embodiments of the present invention, the shape of the locking protrusion 162 may be changed as below, so as to improve operability when the door 130 is closed.

Figure 16:
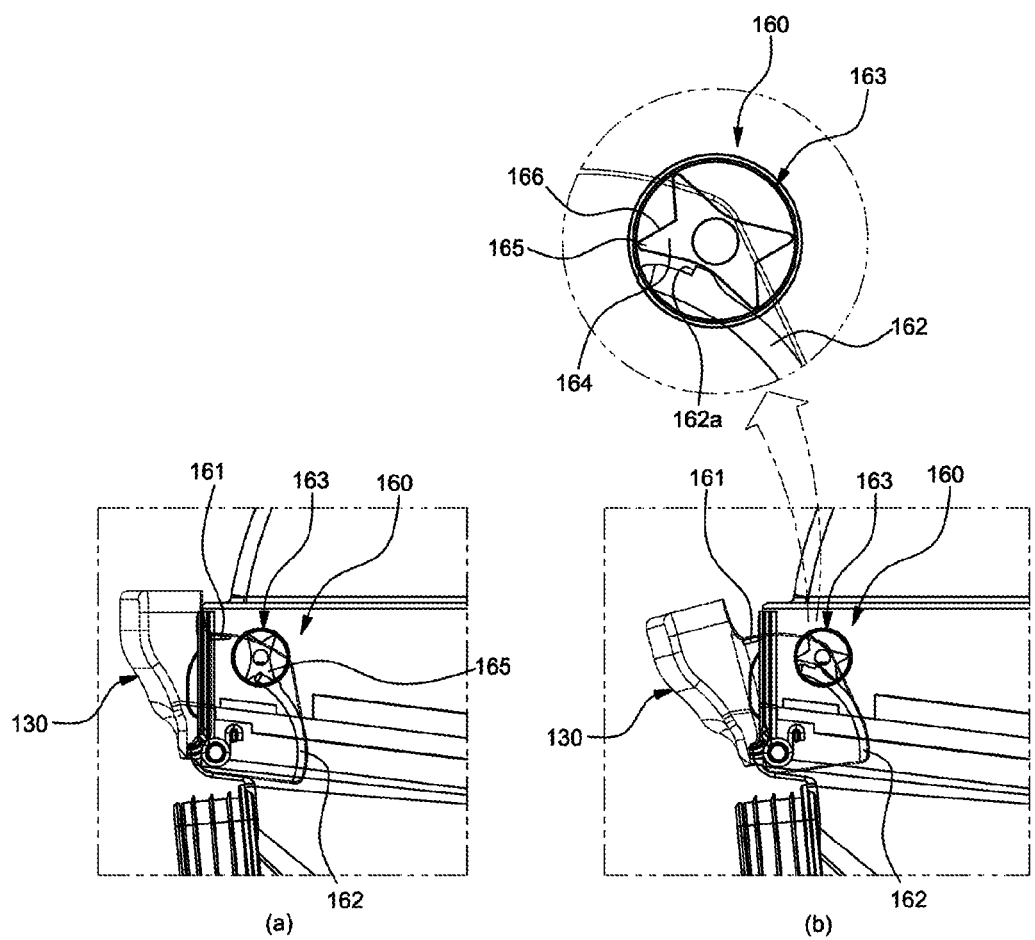
FIGS. 16A and 16B illustrate the shape of an exemplary locking protrusion in accordance with the present invention.
Figure 17:
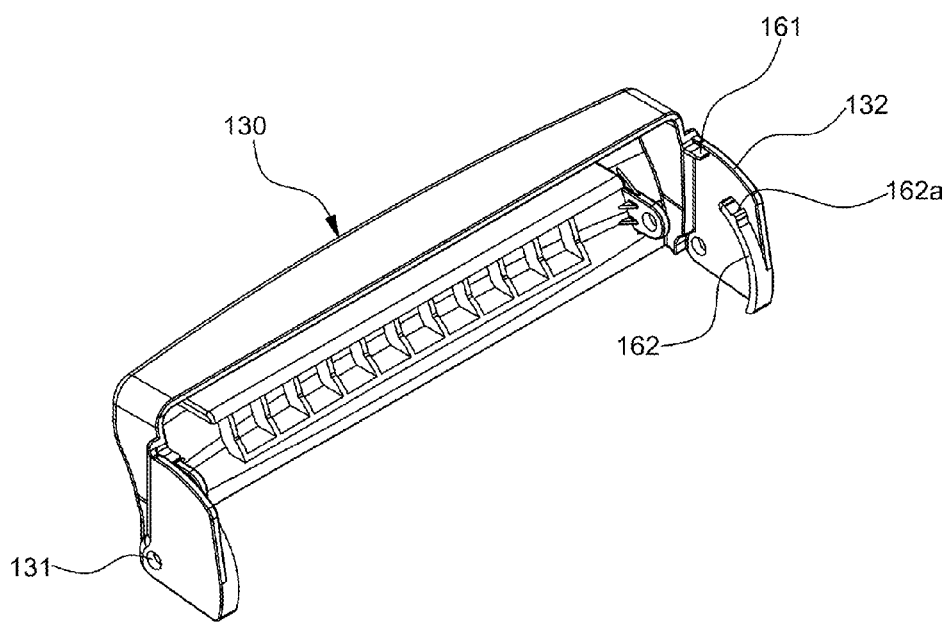
FIG. 17 is a perspective view illustrating the door illustrated in FIGS. 16A and 16B.
Figure 18:
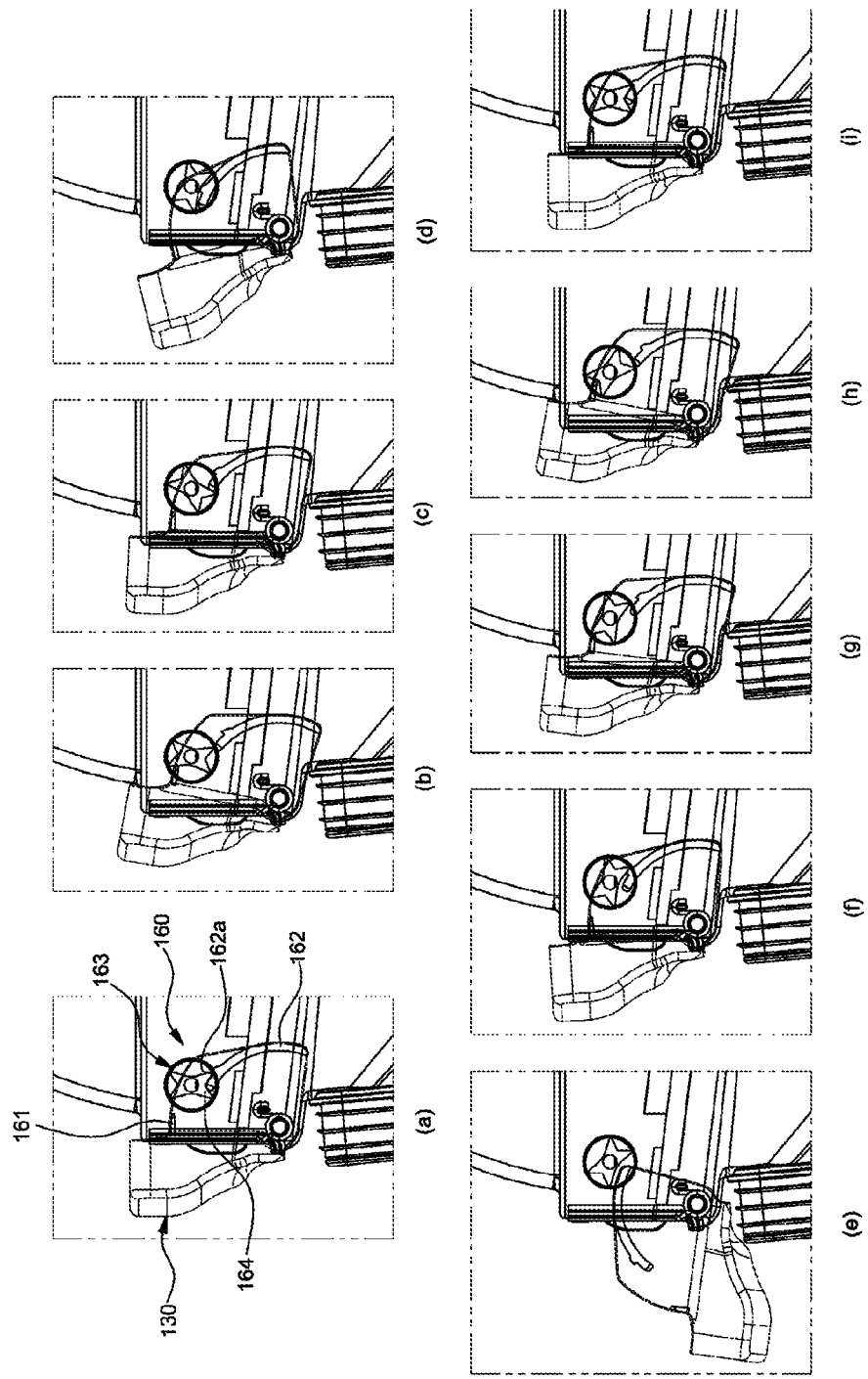
FIG. 18(*a*), FIG. 18(*b*), FIG. 18(*c*), FIG. 18(*d*), FIG. 18(*e*), FIG. 18(*f*), FIG. 18(*g*), FIG. 18(*h*), FIG. 18(*i*), are views illustrating operating states according to positions of the door illustrated in FIGS. 16A and 16B.

FIGS. 16A and 16B illustrate various embodiments of the present invention in which the shape of the locking protrusion 162 is changed, and FIG. 17 is a perspective view illustrating the door 130 illustrated in FIGS. 16A and 16B.

As illustrated in FIGS. 16A and 16B and FIG. 17, the locking protrusion 162 formed at an inner side of the door side part 132 of the door 130 may be formed in the shape of an arc that extends long. In this case, the hanging jaw 162a in which each of the protrusion ends 165 of the locking cam 164 is hung, is formed at a front end of the locking protrusion 162. Due to the shape of the locking protrusion 162, the rotation body 163 is prevented from being rotated at an abnormal angle in a state in which the door 130 is open.

That is, owing to the shape of the locking protrusion 162, the rotation body 163 is prevented from being rotated at an abnormal angle due to the effect of flux or gravity in a state in which the door 130 is open. While the door 130 is open or in a state in which the door 130 is fully open, the locking protrusion 162 regulates a rotation angle of the rotation body 163 to an appropriate angle.

When the locking unit 160 is installed between right and left both door side parts 132 of the door 130 and right and left both case side parts 116 of the case 110, as described above, while the door 130 is open or in a state in which the door 130 is fully open, if the rotation body 163 that is rotatably installed at each of right and left both case side parts 116 of the case 110 is moved due to the effect of flux or gravity and is rotated at an abnormal angle (not at a normal rotation angle), the locking cam 164 of the rotation body 163 may be placed at a position in which movement of the protrusions 161 and 162 is interfered on a movement trajectory of the protrusions 161 and 162 when the door 130 is closed again.

In this case, even though the user wants to close the door 130, the rotation body 163 including the locking cam 164 is not rotated due to the pressing protrusion 161, and closing of the door 130 cannot be performed, and furthermore, a door fixing function that is a basic function of the locking unit 160 including the rotation body 163 cannot be performed.

In particular, when two rotation bodies 163 installed at right and left both case side parts 116 of the case 110 are simultaneously not at the same rotation position and in the same rotation angle range, either side of two rotation bodies 163 may be locked so that complete sealing characteristics cannot be guaranteed.

Thus, in order to perform a stable closing operation of the door 130, appropriate rotation of two rotation bodies 163 and stable fixing of the door 130, the locking protrusion 162 may be formed in an extending shape, as illustrated in FIGS. 16A and 16B and FIG. 17, so that two rotation bodies 163 may be maintained in a normal state (a state in which two rotation bodies 163 can be normally rotated due to the pressing protrusion 161) at the same rotation position and in the same rotation angle range while the door 130 is open or is fully open, i.e., before the door 130 is open and then is closed again.

Owing to the shape of the locking protrusion 162, rotation positions and rotation angles of the locking cam 164 and the rotation body 163 are regulated while the door 130 is open or is fully open, in particular, the rotation positions and rotation angles of the locking cam 164 and the rotation body 163 are properly guided while the door 130 is open/closed, and movement of the locking cam 164 and the rotation body 163 is stably controlled.

Also, owing to the shape of the locking protrusion 162, two rotation bodies 163 are controlled in synchronization with each other so that no difference in rotation position and rotation angle between two rotation bodies 163 may be generated while the door 130 is open/closed, and two rotation bodies 163 show the same movement.

In this way, the locking protrusion 162 is configured to have a long shape in which at least a portion of all lengthwise sections of the locking protrusion 162 is always placed at a lateral position of the locking cam 164 in which rotation of the rotation body 163, in particular, rotation of the locking cam 164 may be regulated, while the door 130 is rotated in an open direction and in a closed direction. For example, the locking protrusion 162 may be configured to have an approximately arc shape around the hinge coupling part 131 that is rotation center of the door 130.

FIGS. 18(a) through 18(i) are views illustrating operating states according to positions of the door 130 illustrated in FIGS. 16A and 16B. There is no large difference between an operating state when the door 130 is open/closed and an operating state illustrated in FIGS. 6 through 15, and thus redundant descriptions thereof will be omitted.

However, the locking protrusion 162 is formed long so that rotation of the locking cam 164 may be regulated and a rotation position and a rotation angle of the locking cam 164 may be guided while the door 130 is open/closed. Thus, at least a portion of all lengthwise sections of the locking protrusion 162 may be placed at the lateral position of the locking cam 164.

Thus, two rotation bodies 163 may be placed at approximately the same rotation position and in approximately the same rotation angle range without a large difference in rotation position and rotation angle, and while there is no movement of the door 130, rotation of the rotation body 163 may be properly guided in a state in which rotation of the rotation body 163 is always defined by the locking protrusion 162.

FIG. 19(a) through 19(c) illustrates states in which deviations occur in rotation directions at rotation positions of the rotation body 163 illustrated in FIGS. 16A and 16B.

FIG. 19(a) illustrates a state in which the locking cam 164 and the rotation body 163 are maintained at an abnormal rotation position and at an abnormal rotation angle, FIG. 19(b) illustrates a state in which the locking cam 164 and the rotation body 163 are rotated relatively clockwise compared to FIG. 19(a), and a state in which the locking cam 164 and the rotation body 163 are rotated relatively counterclockwise compared to FIG. 19(a).

Basically, owing to the locking protrusion 162 having a long arc shape, a rotation direction deviation of two rotation bodies 163 including the locking cam 164 is reduced, and even in FIGS. 19(b) and 19(c), the door 130 may be stably closed, and even when opening/closing of the door 130 is repeatedly performed, owing to the locking protrusion 162, rotation angles of the locking cam 164 and the rotation body 163 can be uniformly controlled to defined angles according to positions of the door 130.

As described above, in an air cleaner for a vehicle according to various embodiments of the present invention, a door locking structure that is not affected by the temperature of an engine compartment is used so that problems such as lowering of a coupling force of a door and door opening caused thereby can be solved.

In an air cleaner for a vehicle according to various embodiments of the present invention, a one touch manipulation type structure in which, when a door is opened/closed, door locking/unlocking can be performed by simple manipulation of pressing the door once so that a filter replacing operation can be more easily and conveniently performed.

In an air cleaner for a vehicle according to various embodiments of the present invention, a damper structure (rubber seals and protrusion parts) between a filter assembly and a link is improved so that, when the door is opened, a sense of luxuriousness can be provided and marketability of the air cleaner for the vehicle can be improved.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air cleaner for a vehicle, the air cleaner comprising:
a filter assembly that removes foreign substances in air;
a case having an accommodation space receiving the filter assembly and an entrance providing access to the filter assembly for replacement of the filter assembly;
a door rotatably installed at the case that opens and closes the entrance of the case;
an elastic member mounted between the door and the case to apply an elastic restoring force to the door in an opened direction; and
a locking unit installed between the door and the case to lock the door at a predetermined closed position and unlock the door by one touch manipulation by pressing the door in the closed position, wherein the locking unit is configured between a case side part and a door side part that surrounds the case side part, to selectively perform door locking or unlocking depending on a rotation position of the door.

2. The air cleaner of claim 1, further comprising a link unit including opposing ends rotatably installed to the case and the door, respectively, wherein the link unit causes the filter assembly to closely contact the case and to release the close contact state of the filter assembly while being interlocked with rotation of the door.

3. The air cleaner of claim 2, wherein the link unit comprises:
 a first link including one end rotatably coupled to the case; and
 a second link including opposing ends rotatably coupled to the first link and the door, respectively, wherein the second link causes the filter assembly to closely contact an inner side of the case when the door is closed.

4. The air cleaner of claim 3, wherein the second link pushes a coupling protrusion that protrudes from a frame of the filter assembly, to cause the filter assembly to closely contact the inner side of the case.

5. The air cleaner of claim 4, wherein rubber seals that contact the second link are installed in a partial section of the coupling protrusion in a lengthwise direction, and protrusion parts are integrally formed in the remaining section of the coupling protrusion in which no rubber seal is installed, to reduce friction between the second link and the coupling protrusion.

6. The air cleaner of claim 1, wherein the locking unit locks the door by one touch manipulation of pressing the door closed up to the closed position, more rotating the door and then releasing the pressed state of the door.

7. The air cleaner of claim 1, wherein the locking unit comprises:
 protrusions that protrude from the door; and
 a rotation body rotatably installed at the case and is selectively rotated, rotation-confined and confinement-released due to the protrusions depending on the rotation position of the door;
 wherein, when the rotation body is rotation-confined due to the protrusions of the door at the closed position, door locking is performed.

8. The air cleaner of claim 7, wherein a locking cam, to which the protrusions of the door are locked, protrudes from the rotation body, and the protrusions of the door push sides of the locking cam to rotate the rotation body and are locked to the locking cam to confine rotation of the rotation body.

9. The air cleaner of claim 8, wherein the protrusions of the door comprise:
 a pressing protrusion that, when the door is rotated, pushes the sides of the locking cam rotate the rotation body; and
 a locking protrusion that, when the door is rotated, pushes the sides of the locking cam to rotate the rotation body and locked to the sides of the locking cam in an engaging manner.

10. The air cleaner of claim 9, wherein the pressing protrusion and the locking protrusion sequentially push the sides of the locking cam to rotate the locking cam and the rotation body in one direction while the door is rotated in a backlash section that is pressed further than the closed position.

11. The air cleaner of claim 10, wherein the pressing protrusion pushes the sides of the locking cam while the door is pressed at the closed position, and the locking protrusion pushes the sides of the locking cam while the door is pressed at the closed position and then is rotated by an elastic member in an opened direction.

12. The air cleaner of claim 9, wherein the locking cam comprises protrusion-shaped protrusion ends in which locking to the locking protrusion is performed, and groove parts that are formed between two adjacent protrusion ends and push the pressing protrusion and the locking protrusion, and
 a hanging jaw is formed at the locking protrusion in such a way that the hanging jaw is hung in each of the protrusion ends of the locking cam and locking is performed in an engaging manner.

13. The air cleaner of claim 12, wherein the locking cam comprises four protrusion ends that protrude from the sides of the locking cam and four groove parts formed between two adjacent protrusion ends.

14. The air cleaner of claim 13, wherein the protrusion ends and the groove parts of the locking cam are symmetrically formed with respect to at least one axial line that passes through a rotation center of the locking cam.

15. The air cleaner of claim 14, wherein, while the door is rotated in the backlash section in which the door is more pressed than the closed position, the pressing protrusion and the locking protrusion sequentially push one of the groove parts placed at an interval of 1800 in opposite directions so as to rotate the locking cam and the rotation body in one direction.

16. The air cleaner of claim 9, wherein the locking protrusion has a long-extending shape in which the rotation body and the locking cam are capable of being regulated to a defined rotation position and a defined rotation angle.

17. The air cleaner of claim 16, wherein the locking protrusion is long formed to have an arc shape around a hinge coupling part that is a rotation center of the door.

18. The air cleaner of claim 16, wherein the locking protrusion has a long shape in which at least a portion of all lengthwise sections of the locking protrusion is placed at a lateral position of the locking cam in which rotation of the locking cam is capable of being regulated, while the door is rotated in an open direction and in a closed direction.

19. The air cleaner of claim 16, wherein a hanging jaw in which each of the protrusion ends of the locking cam is hung and locking is performed in an engaging manner, is formed at a front end of the locking protrusion.

20. The air cleaner of claim 1, wherein the air cleaner includes two of the locking units, one of the locking units configured between a right case side part and a right door side part that surrounds the right case side part, and the other of the locking units configured between a left case side part and a left door side part that surrounds the left case side part.

* * * * *